(12) United States Patent
Chen et al.

(10) Patent No.: US 9,013,664 B2
(45) Date of Patent: Apr. 21, 2015

(54) LIQUID CRYSTAL DISPLAY PANEL

(71) Applicant: Innolux Corporation, Miao-Li County (TW)

(72) Inventors: Yu-Wei Chen, Miao-Li County (TW); Chien-Hung Chen, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 168 days.

(21) Appl. No.: 13/890,289

(22) Filed: May 9, 2013

(65) Prior Publication Data

US 2013/0335692 A1 Dec. 19, 2013

(30) Foreign Application Priority Data

Jun. 13, 2012 (TW) .............................. 101121172 A

(51) Int. Cl.
  *G02F 1/1343* (2006.01)
  *G02F 1/1337* (2006.01)
  *G02F 1/1333* (2006.01)
  *G02F 1/1335* (2006.01)
  *G02F 1/137* (2006.01)

(52) U.S. Cl.
  CPC ........ *G02F 1/1333* (2013.01); *G02F 1/133504* (2013.01); *G02F 1/133707* (2013.01); *G02F 2001/13793* (2013.01)

(58) Field of Classification Search
  CPC .................... G02F 1/134336; G02F 1/133707; G02F 1/1393; G02F 1/1333; G02F 1/133351; G02F 1/133753
  USPC ................................. 349/143, 129, 146, 158
  See application file for complete search history.

(56) References Cited

U.S. PATENT DOCUMENTS

2004/0080690 A1* 4/2004 Ko et al. ...................... 349/114
2006/0114386 A1* 6/2006 Choi ............................ 349/123

OTHER PUBLICATIONS

Cheng, et al.:"Vertical field switching for blue-phase liquid crystal devices"; American Institute of Physics; Applied Physics Letters 98, 261102 (2011).

* cited by examiner

*Primary Examiner* — Mike Qi
(74) *Attorney, Agent, or Firm* — McClure, Qualey & Rodack, LLP

(57) ABSTRACT

A liquid crystal display panel including a first substrate, a second substrate, and a liquid crystal mixture is provided. The first substrate includes a first base and a first electrode layer. The first base has a plurality of sub pixels each having at least one first asymmetric protrusion. The first electrode layer is disposed on the first asymmetric protrusion. The second substrate is assembled to the first substrate. The liquid crystal mixture is disposed between the first asymmetric protrusion and the second substrate.

20 Claims, 15 Drawing Sheets

LIQUID CRYSTAL DISPLAY PANEL

This application claims the benefit of Taiwan application Serial No. 101121172, filed Jun. 13, 2012, the subject matter of which is incorporated herein by reference.

BACKGROUND OF THE INVENTION

1. Field of the Invention

The invention relates in general to a liquid crystal display panel, and more particularly to a liquid crystal display panel having a first asymmetric protrusion disposed in each sub pixel.

2. Description of the Related Art

The blue phase liquid crystal is a liquid crystal material being optically isotropic, having advantages of fast response time and not requiring alignment film. The blue phase liquid crystal is optically isotropic before applying a voltage and is optically anisotropic after applying a voltage. Therefore, the blue phase liquid crystal having such many electrical and optical properties is used in a display.

The blue phase liquid crystal requires a high operating voltage. Therefore, how to reduce the operating voltage and maintain or enhance the transmittance or liquid crystal efficiency of blue phase liquid crystal under the operating voltage has become a prominent task for the industries.

SUMMARY OF THE INVENTION

The invention is directed to a liquid crystal display panel, in which a first asymmetric protrusion is used for guiding incident lights in each area of the sub pixel to different predetermined directions and increasing the transmittance and liquid crystal efficiency of the incident light in each area. When the first asymmetric protrusion is collocated with incident lights of different directions, multi-domain display quality is enhanced and the liquid crystal display panel can achieve excellent wide viewing angle.

According to an embodiment of the present invention, a liquid crystal display panel including a first substrate, a second substrate, and a liquid crystal mixture is provided. The first substrate includes a first base and a first electrode layer. The first base has a plurality of sub pixels each having at least one first asymmetric protrusion. The first electrode layer is disposed on the first asymmetric protrusion. The second substrate is assembled to the first substrate. The liquid crystal mixture is disposed between the first asymmetric protrusion and the second substrate.

The above and other aspects of the invention will become better understood with regard to the following detailed description of the preferred but non-limiting embodiment(s). The following description is made with reference to the accompanying drawings.

DETAILED DESCRIPTION OF THE INVENTION

A liquid crystal display panel is disclosed in an embodiment of the invention. Through the design of a first asymmetric protrusion, liquid crystal molecules in each sub pixel have different inclination angles when applying a voltage. When the first asymmetric protrusion is collocated with incident lights of different predetermined directions, the optical path passing through a liquid crystal area is prolonged, more phase retardation is accumulated, the transmittance is increased, and the required operating voltage is reduced. Since the incident lights have different predetermined directions, the multi-domain display quality is enhanced and the liquid crystal display panel may achieve excellent wide viewing angle. However, detailed structures and procedures of the manufacturing process disclosed in the embodiment of the invention are for exemplification only, not for limiting the scope of protection of the invention. Anyone who is skilled in the technology of the invention may make necessary modifications or variations to the structures and procedures to fit actual needs.

Figure 1:
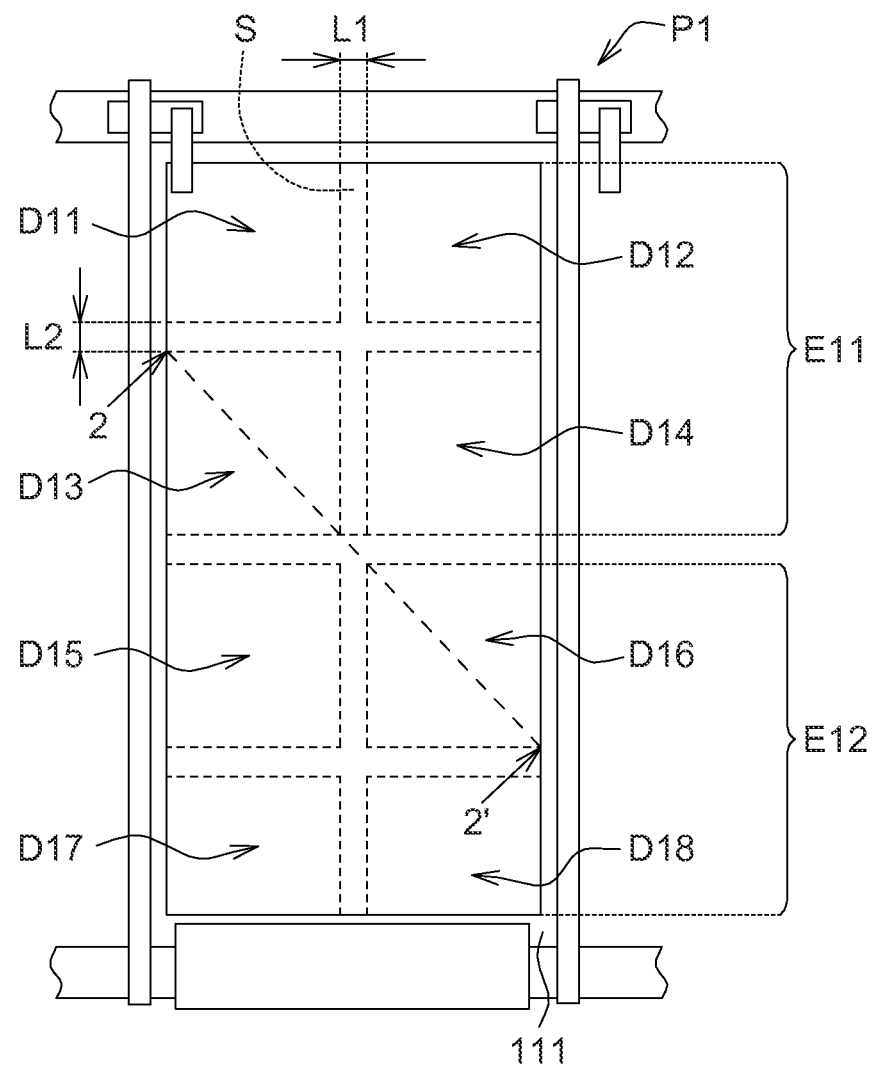
FIG. 1 shows a top view of a liquid crystal display panel according to an embodiment of the invention.

Referring to FIG. 1 and FIGS. 2A-2E. FIG. 1 shows a top view of a liquid crystal display panel according to an embodiment of the invention. FIGS. 2A-2E are cross-sectional views along a cross-sectional line 2-2' of FIG. 1.

Figure 2A:
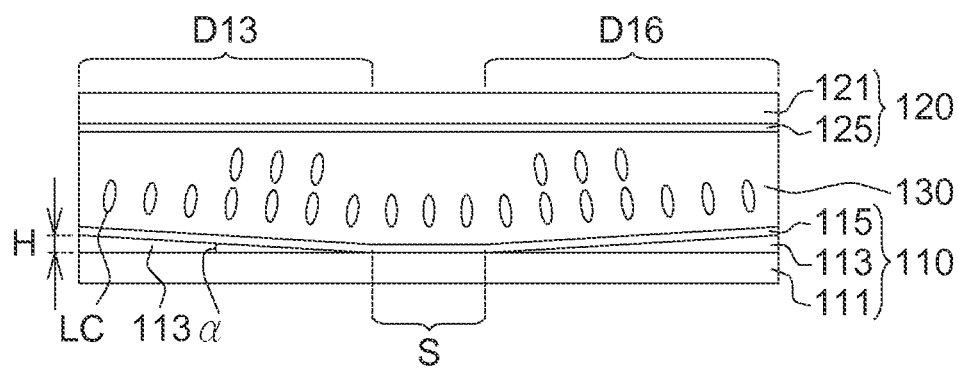
FIGS. 2A-2E are cross-sectional views along a cross-sectional line 2-2' of FIG. 1.

As indicated in FIG. 1 and FIG. 2A, the liquid crystal display panel 10 includes a first substrate 110, a second substrate 120, and a liquid crystal mixture 130. The second substrate 120 is assembled to the first substrate 110. The first substrate 110 includes a first base 111 and a first electrode layer 115. As indicated in FIG. 1, the first base 111 has a plurality of sub pixels, and each sub pixel has at least one area. The length and the width of each area both are between 100-400 micrometers (μm), but the implementation of the invention is not limited thereto. In the embodiment, a sub pixel P1 of the first base 111 has electrode units E11 and E12, wherein the electrode unit E11 includes a plurality of areas D11-D14, and the electrode unit E12 includes a plurality of areas D15-D18. In the embodiment as indicated in FIG. 2A, a first asymmetric protrusion 113 is disposed on the area D13 of the first base 111, and the first electrode layer 115 is disposed on the first asymmetric protrusion 113. The liquid crystal mixture 130 is disposed between the first asymmetric protrusion 113 and the second substrate 120.

In the embodiment, the first asymmetric protrusion 113 is disposed in the first substrate 110 and located at one side of the first base 111 near the liquid crystal mixture 130. In the embodiment, the first asymmetric protrusions 113 are disposed corresponding to each area of the electrode unit, and the second substrate 120 is a fully covered electrode type substrate. As such, when the second substrate 120 is assembled to the first substrate 110, there is no need to consider alignment error, and the alignment error-caused deterioration in display quality will not occur easily.

The directions of the incident lights may be changed by collocating the incident lights of different directions in different areas with the first asymmetric protrusions of different angles and shapes. Consequently, the light after entering the liquid crystal layer may have higher transmittance and produce better liquid crystal efficiency. Furthermore, since different areas have different transmission directions, wide viewing angle can thus be achieved.

In the embodiment, the cross section of the first asymmetric protrusion 113 is such as an asymmetric triangle with two lateral sides having unequal lengths, an asymmetric trapezoid with two lateral sides having unequal lengths, an asymmetric polygon, or an asymmetric arc projected from the top surface of the asymmetric protrusion. As indicated in FIG. 2A, in the embodiment, the cross sections of the first asymmetric protrusions 113 are such as a plurality of right triangles whose base angle $\alpha$ is between 1°-80°. The largest height H of the cross sections of the first asymmetric protrusions 113 is such as 3 µm. The first asymmetric protrusion 113 is formed of such as titanium oxide or other material with high transmittance, low reflectivity, and low absorption, but the implementation of the invention is not limited thereto.

In an embodiment, a gap S is interposed between two first asymmetric protrusions 113, and a width L1 and a width L2 of the gap S at different positions are between 0-10 µm. The gap S interposed between two first asymmetric protrusions 113 may be a space or a structure having a flat surface. Referring to both FIG. 1 and FIG. 2A. In an embodiment, the gap S interposed between the first asymmetric protrusion 113 in the area D13 and the first asymmetric protrusion 113 in the area D16 may be a space in which a surface of the first base 111 is exposed between two first asymmetric protrusions 113. The gap S may be used as a buffer area, which prevents the overall display quality of the liquid crystal display panel 10 from being affected by alignment errors generated when the first substrate 110 and the second substrate 120 are assembled together.

In an embodiment, the first base 121 and the first electrode layer 115 both have high transmittance for lights. The first base 121 is formed of such as glass or flexible polymer. The first electrode layer 115 is formed of such as indium tin oxide (ITO), but the implementation of the invention is not limited thereto.

In an embodiment as indicated in FIG. 2A, the second substrate 120 may include a second base 121 and a second electrode layer 125 disposed on the second base 121. In the embodiment as indicated in FIG. 2A, the first electrode layer 115 of the first substrate 110 completely covers and directly contacts the first asymmetric protrusion 113. In the embodiment, the liquid crystal molecules LC are such as blue phase liquid crystal molecules. The blue phase liquid crystal molecules LC of the liquid crystal mixture 130 are optically isotropic when no voltage is applied thereon, and are arranged on the first base 110 along the shape of the first asymmetric protrusion 113. As indicated in FIG. 2A, the blue phase liquid crystal molecules LC of the liquid crystal mixture 130 will be affected by an electrical field and become optically anisotropic when a voltage is applied thereon. A long axis of the equivalent liquid crystal molecules LC affected by the electrical field will be arranged in a direction parallel to the electrical field generated by the first electrode layer 115 and the second electrode layer 125 disposed oppositely, and the liquid crystal molecules LC will be distributed between the first electrode layer 115 and the second electrode layer 125.

The actual arrangement of the blue phase liquid crystals is complicated. However, the birefringence properties of blue phase liquid crystals after applied with a voltage can be represented by equivalent liquid crystal molecules having a variety of birefringence coefficients $\Delta n$, wherein $\Delta n$ denotes a birefringence coefficient of a liquid crystal material. The long axis of the equivalent liquid crystal molecules LC is approximately parallel to the direction of the electrical field, and the magnitude of the birefringence coefficient $\Delta n$ is determined by the intensity of the electrical field. In general, the larger intensity of the electrical field is, the larger magnitude of the birefringence coefficient $\Delta n$ will be, and the magnitude of birefringence coefficient $\Delta n$ will gradually saturate as electrical field gets much large intense. Hereinafter, the description of the optical effects of the blue phase liquid crystal molecules LC are represented in the form of the equivalent liquid crystal molecules LC.

Thus, the inclination angles of the liquid crystal molecules LC may be effectively adjusted through the structural design of the first asymmetric protrusions 113, so that an angle $\theta$ is formed between the incident light and the long axis direction of the equivalent liquid crystal molecules LC. The angle $\theta$ is about 30-90°, and the closer to 90° the angle is, the better birefringence characteristics the incident light will experience. That is, a larger angle formed between the arrangement direction (the long axis direction) of the equivalent liquid crystal molecules LC and the optical path direction of the incident light makes the light experience larger birefringence. Consequently, the transmittance is increased, the operating voltage is reduced, and excellent display quality is provided.

In an embodiment, the first asymmetric protrusion 113 and the first electrode layer 115 may be formed of the same material, such as indium tin oxide (ITO), but the implementation of the invention is not limited thereto. In the embodiment, when the first asymmetric protrusion 113 and the first electrode layer 115 are formed of the same material, the first asymmetric protrusion 113 and the first electrode layer 115 may be formed in one manufacturing process, so that the first asymmetric protrusion 113 and the first electrode layer 115 are integrated integrally into one asymmetric protruded electrode. Thus, the asymmetric protruded electrode may achieve both effects provided by the first asymmetric protrusion 113 and the first electrode layer 115, and the manufacturing process can be further simplified.

Figure 2B:
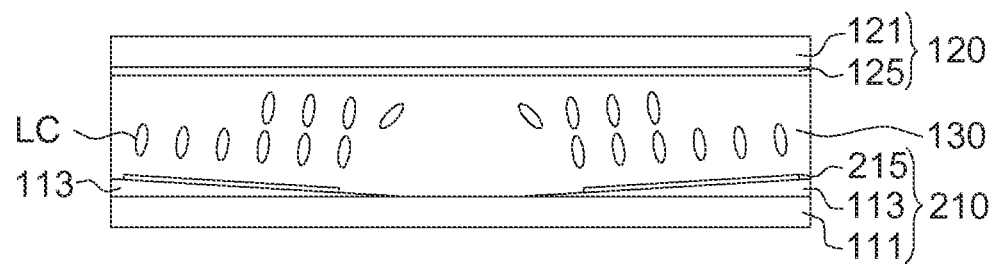

In an embodiment as indicated in FIG. 2B, the second substrate 120 includes a second base 121 and a second electrode layer 125, wherein the second electrode layer 125 is disposed on the second base 121. In the embodiment, the first electrode layer 215 of the first substrate 210 partially covers and directly contacts the first asymmetric protrusion 113. The liquid crystal molecules LC of the liquid crystal mixture 130 are distributed between the first electrode layer 215 and the second electrode layer 125. As indicated in FIG. 2B, the blue phase liquid crystal molecules LC of the liquid crystal mixture 130 will be affected by the electrical field and become optically anisotropic when a voltage is applied thereon. Furthermore, the long axis of the equivalent liquid crystal molecules LC affected by the electrical field will be arranged in a direction parallel to the direction of the electrical field generated by the first electrode layer 215 and the second electrode layer 125. Through the selection of the position of the first asymmetric protrusion 113 where the first electrode layer 215 covers, the inclination angle of the liquid crystal molecules LC may be effectively adjusted, and an angle θ is formed between the incident light and the long axis direction of the equivalent liquid crystal molecules LC. The angle θ is between 30-90°, and the closer to 90° the angle is, the better birefringence characteristics the incident light will experience. That is, a larger angle formed between the arrangement direction (the long axis direction) of the equivalent liquid crystal molecules LC and the optical path direction of the incident light makes the light experience larger birefringence. Consequently, the transmittance is increased, the operating voltage is reduced, and excellent display quality is provided.

In an embodiment, the first asymmetric protrusion 113 and the first electrode layer 215 may be formed of the same material, such as indium tin oxide (ITO), but the implementation of the invention is not limited thereto. In the embodiment, when the first asymmetric protrusion 113 and the first electrode layer 215 are formed of the same material, the first asymmetric protrusion 113 and the first electrode layer 215 may be formed in one manufacturing process.

Figure 2C:
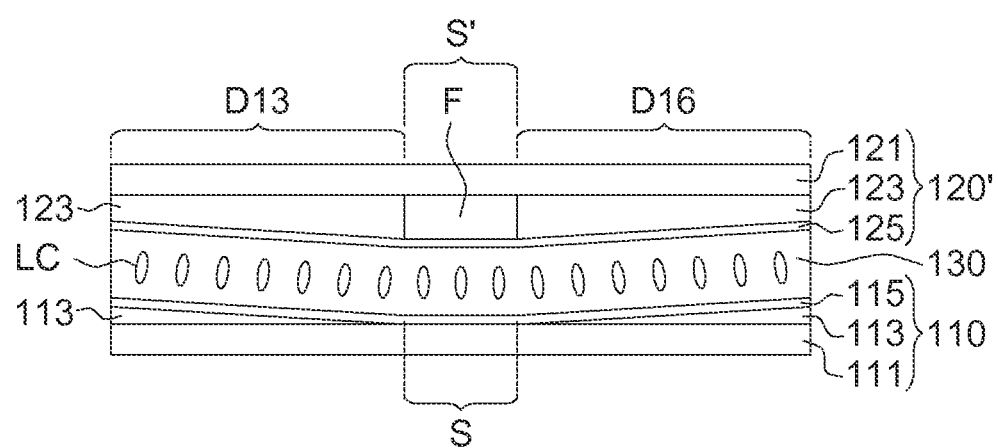

In an embodiment as indicated in FIG. 2C, the second substrate 120' may include a second base 121, a third asymmetric protrusion 123, and a second electrode layer 125. The third asymmetric protrusion 123 is disposed on the second base 121, and the second electrode layer 125 is disposed on the third asymmetric protrusion 123. In the embodiment as indicated in FIG. 2C, the first electrode layer 115 of the first substrate 110 completely covers and directly contacts the first asymmetric protrusion 113, but the implementation of the invention is not limited thereto. For example, the first electrode layer 115 may partially cover and directly contact the first asymmetric protrusion 113 (not illustrated). In the embodiment, the liquid crystal molecules LC are such as blue phase liquid crystal molecules. As indicated in FIG. 2C, the blue phase liquid crystal molecules LC of the liquid crystal mixture 130 will be affected by electrical field and become optically anisotropic when a voltage is applied thereon. Furthermore, the long axis of the equivalent liquid crystal molecules LC affected by the electrical field will be arranged in a direction parallel to the direction of the electrical field generated by the first electrode layer 115 and the second electrode layer 125, and the liquid crystal molecules LC will be distributed between the first electrode layer 115 and the second electrode layer 125. Through suitable design of relative positions between the first asymmetric protrusion 113 and the third asymmetric protrusion 123 and shapes of the first asymmetric protrusion 113 and the third asymmetric protrusion 123, the inclination angle of the liquid crystal molecules LC may be effectively adjusted, and an angle θ is formed between the incident light and the long axis direction of the equivalent liquid crystal molecules LC. The angle θ is 30-90°, and the closer to 90° the angle is, the better birefringence characteristics the incident light will experience, so that the transmittance is increased, the operating voltage is reduced, and excellent display quality is provided.

Accordingly, when different areas are collocated with different directions of the incident lights, and the index of refraction and inclination angle of the first asymmetric protrusion are collocated with that of the third asymmetric protrusion, excellent light-emitting can be provided in different directions of viewing angles, and wide viewing angle can thus be achieved.

In an embodiment, the cross section of the third asymmetric protrusion 123 is such as an asymmetric triangle with two lateral sides having unequal lengths, an asymmetric trapezoid with two lateral sides having unequal lengths, an asymmetric polygon, or an asymmetric arc projected from the top surface of the asymmetric protrusion. In an embodiment as indicated in FIG. 2C, the cross section of the third asymmetric protrusion 123 is such as an asymmetric trapezoid with two lateral sides having unequal lengths. In another embodiment as indicated in FIG. 3C, the cross section of the third asymmetric protrusion 123 is such as a right triangle.

In an embodiment, a gap S' may be disposed between two third asymmetric protrusions 123, wherein a width L of the gap S' is between 0-10 μm, and the gap S' is disposed corresponding to where the gap S is disposed between two first asymmetric protrusions 113. The gap S' disposed corresponding to where the gap S is disposed may be used as a buffer area, so that the overall display quality of the liquid crystal display panel 10 is less affected by the assembling error between the first substrate 110 and the second substrate 120'. The gap S' is such as a space between two third asymmetric protrusions 123 without having any asymmetric protrusions disposed therein. A structure with a planarized surface may be disposed in the gap S' between two third asymmetric protrusions 123. In an embodiment as indicated in FIG. 2C, a structure F with a flat surface may be disposed in the gap S' between the third asymmetric protrusion 123 in the area D13 and the third asymmetric protrusion 123 in the area D16.

In an embodiment, the third asymmetric protrusion 123 and the second electrode layer 125 may be formed of the same material, such as indium tin oxide (ITO), but the implementation of the invention is not limited thereto. In the embodiment, when the third asymmetric protrusion 123 and the second electrode layer 125 are formed of the same material, the formation of the third asymmetric protrusion 123 and the formation of the second electrode layer 125 may be carried out in one manufacturing process to simplify the manufacturing process.

Figure 2D:
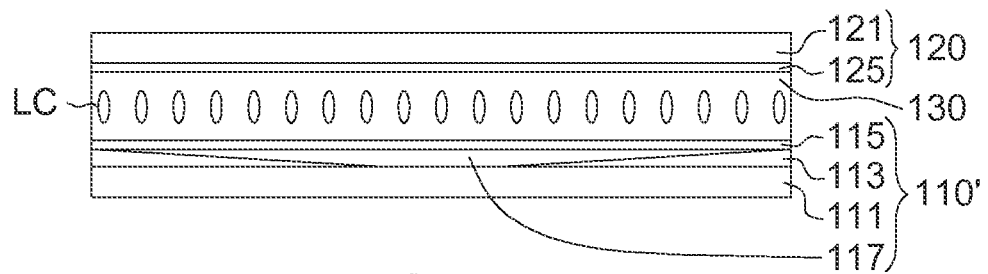

In an embodiment as indicated in FIG. 2D, the first substrate 110' includes a first base 111, a first asymmetric protrusion 113, a first electrode layer 115, and a first planarized layer 117. The first planarized layer 117 is disposed on the first asymmetric protrusion 113, and the first electrode layer 115 is disposed on the first planarized layer 117. In the embodiment, the index of refraction of the first planarized layer 117 and the index of refraction of the first asymmetric protrusion 113 are different, and the refraction angle of the incident light may be effectively adjusted by adjusting the magnitudes of and the relationships between the two indices of refraction. In the embodiment as indicated in FIG. 2D, the first electrode layer 115 completely covers and directly contacts the first planarized layer 117, but the implementation of the invention is not limited thereto. For example, the first electrode layer may partially cover the first planarized layer 117 (not illustrated). In the embodiment, the flat surface provided by the first planarized layer 117 is beneficial to the coating of the first electrode layer 115 in the subsequent process, so that the process of forming the first electrode layer 115 and the process of selecting a covering position can be simplified. The liquid crystal molecules LC of the liquid crystal mixture 130 are distributed between the first electrode layer 115 and the second electrode layer 125.

Figure 2E:
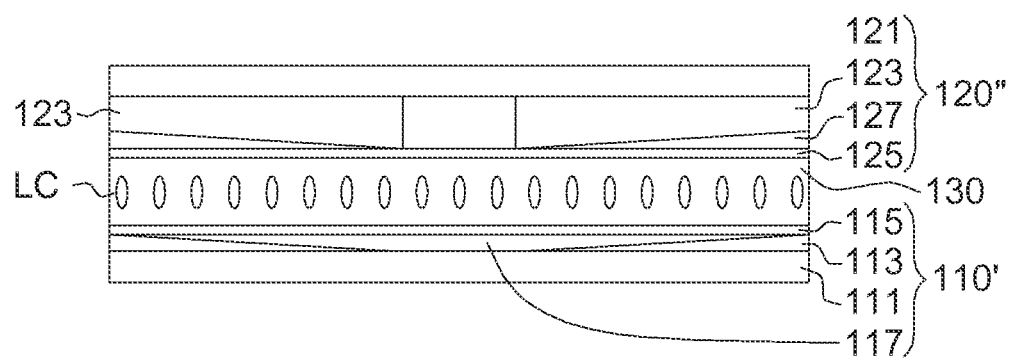

In an embodiment as indicated in FIG. 2E, the second substrate 120'' may include a second base 121, a second asymmetric protrusion 123, a second electrode layer 125, and a second planarized layer 127. The second planarized layer 127 is disposed on the third asymmetric protrusion 123, and the second electrode layer 125 is disposed on the second planarized layer 127. The index of refraction of the second planarized layer 127 and the index of refraction of the third asymmetric protrusion 123 are different. In the embodiment as indicated in FIG. 2E, the second electrode layer 125 completely covers and directly contacts the second planarized layer 127, but the implementation of the invention is not limited thereto. For example, the second electrode layer may partially cover the second planarized layer 127 (not illustrated). The liquid crystal molecules LC of the liquid crystal mixture 130 are distributed between the first electrode layer 115 and the second electrode layer 125. By collocating the asymmetric protrusions of different shapes and angles in different areas with the planarized layers of different indices of refraction, the incident angle of the light is adjusted, and the emitting angle of the light passing through the liquid crystal layer is affected accordingly. Further, by collocating different areas with different directions of the incident light, different emission directions are provided in different areas, and the effect of wide viewing angle display can thus be achieved.

In the embodiment, the sub pixel P1 of the first base 111 has areas D11-D18. In the present embodiment, the first asymmetric protrusions are symmetrically arranged. In other embodiments, the first asymmetric protrusions may be collocated with areas of different sizes according to the structural design of the first asymmetric protrusion. For example, as the structural design at the left-hand side and the structural design at the right-hand side are different, the optical contributions made by the liquid crystal molecules to the left-hand side and that to the right-hand side are different, and thus, the first asymmetric protrusions may be collocated with areas of different sizes and positions or different asymmetric designs.

Through the first asymmetric protrusions 113 having different tilted directions disposed in different areas, the refraction angles of the incident lights in different areas may be effectively adjusted for guiding the incident lights of different areas towards different predetermined directions, and the incident lights may pass through the liquid crystal molecules in a direction approximately perpendicular to the long axis direction of the liquid crystal molecules LC and experience better birefringence characteristics. That is, a larger angle formed between the arrangement direction (the long axis direction) of the equivalent liquid crystal molecules LC and the optical path direction of the incident light makes the incident light experience larger birefringence, so that the transmittance is increased, the operating voltage is reduced, and excellent display quality is achieved.

In addition, as indicated in FIG. 1, the sub pixel P1 has two electrode units E11 and E12. The arrangements of the first asymmetric protrusions 113 in the plurality of areas of the electrode units E11 and E12 may be the same or different. In an embodiment, the number, shape and arrangement of the first asymmetric protrusions 113 in the areas D11-D14 are the same with that of the first asymmetric protrusions 113 in the areas-D15-D18. In another embodiment, the number, shape and arrangement of the first asymmetric protrusions 113 in the areas D11-D14 are different from that of the first asymmetric protrusions 113 in the areas-D15-D18.

Figure 3:
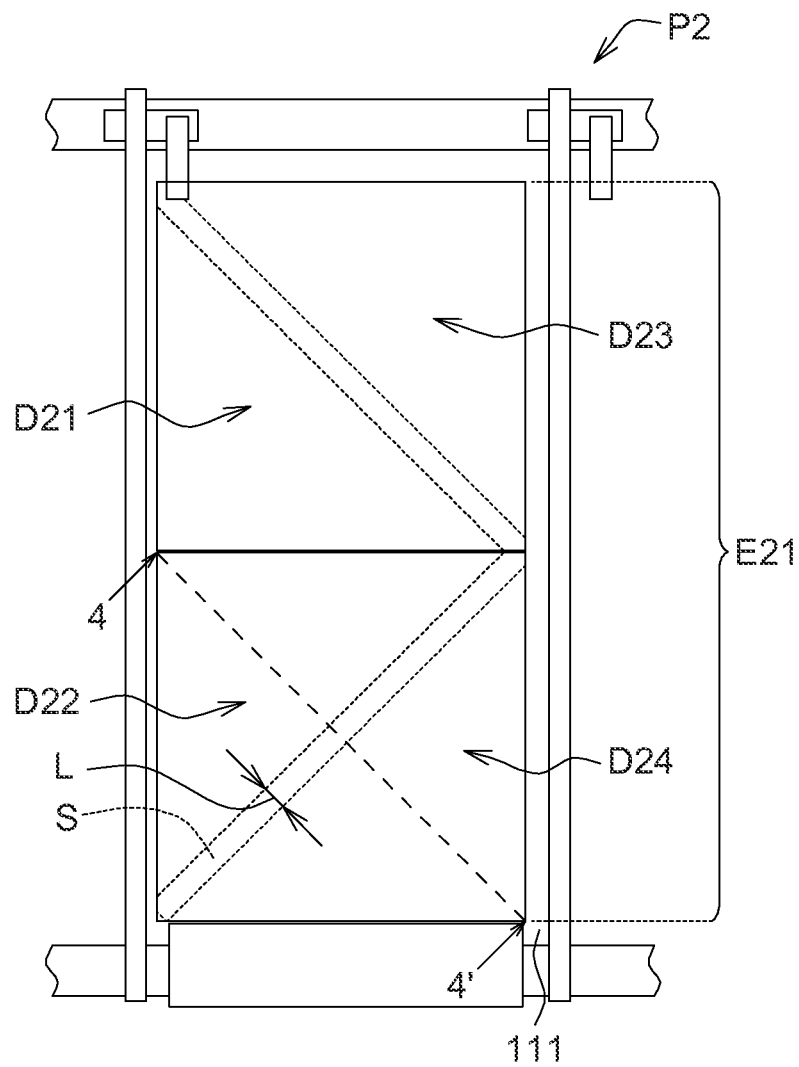
FIG. 3 shows a top view of a liquid crystal display panel according to another embodiment of the invention.
Figure 4A:
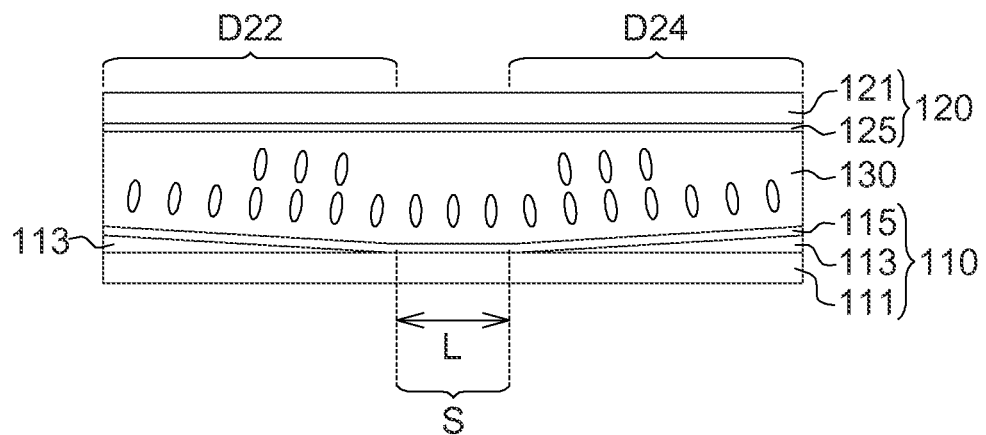
FIGS. 4A-4B are cross-sectional views along a cross-sectional line 4-4' of FIG. 4.
Figure 4B:
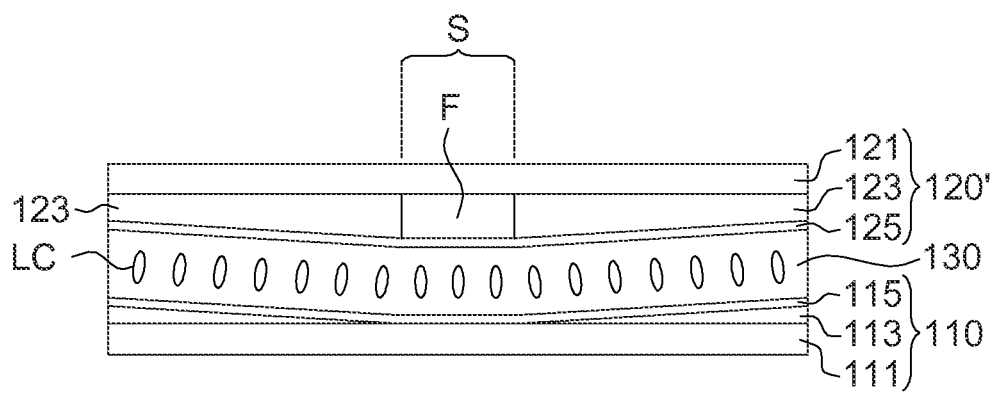

Referring to FIG. 3 and FIGS. 4A-4B. FIG. 3 shows a top view of a liquid crystal display panel according to another embodiment of the invention. FIGS. 4A-4B are cross-sectional views along a cross-sectional line 4-4' of FIG. 3. As indicated in FIG. 3, the first base 111 has a plurality of sub pixels. In the embodiment, the sub pixel P2 has an electrode unit E21. The electrode unit E21 includes four areas D21, D22, D23 and D24, but the implementation of the invention is not limited thereto.

As indicated in FIG. 3 and FIG. 4A, the liquid crystal display panel 10 includes a first substrate 110, a second substrate 120 and a liquid crystal mixture 130. The second substrate 120 is assembled to the first substrate 110. The first substrate 110 includes a first base 111, a first asymmetric protrusion 113 and a first electrode layer 115.

In an embodiment as indicated in FIG. 4A, the cross section of the first asymmetric protrusion 113 is such as a right triangle. In an embodiment, a gap S is disposed between two first asymmetric protrusions 113, wherein a width L of the gap S is between 0-10 µm. Referring to FIG. 3 and FIG. 4A, in the embodiment, the gap S located between two first asymmetric protrusions 113 in the areas D22 and D24 exposes a part of a surface of the first base 111. The gap S may be used as a buffer area, so that the overall display quality of the liquid crystal display panel 10 is less affected by the assembling error between the first substrate 110 and the second substrate 120.

In the embodiment as indicated in FIG. 4A, the first electrode layer 115 of the first substrate 110 completely covers and directly contacts the first asymmetric protrusion 113. In the embodiment, the liquid crystal molecules LC are such as blue phase liquid crystal molecules, and the blue phase liquid crystal molecules LC of the liquid crystal mixture 130 are optically isotropic when no voltage is applied thereon, and the blue phase liquid crystal molecules LC are inclinedly arranged on the first electrode layer 115 along the shape of the first asymmetric protrusion 113. As indicated in FIG. 4A, the blue phase liquid crystal molecules LC of the liquid crystal mixture 130 will be affected by the electrical field and become optically anisotropic when a voltage is applied thereon. Furthermore, the long axis of the equivalent liquid crystal molecules LC affected by the electrical field will be arranged in a direction parallel to the direction of the electrical field generated by the first electrode layer 115 and the second electrode layer 125, and the liquid crystal molecules LC will be distributed between the first electrode layer 115 and the second electrode layer 125. Thus, the inclination angle of the liquid crystal molecules LC may be effectively adjusted through the structural design of the first asymmetric protrusion 113, so that the incident light may pass through the liquid crystal molecules in a direction approximately perpendicular to the long axis direction of the liquid crystal molecules LC and experience better birefringence characteristics. That is, a larger angle formed between the arrangement direction (the long axis direction) of the equivalent liquid crystal molecules LC and the optical path direction of the incident light makes the incident light experience larger birefringence, so that the transmittance is increased, the operating voltage is reduced, and excellent display quality is achieved.

In an embodiment, the first asymmetric protrusion 113 and the first electrode layer 115 may be formed of the same material, such as indium tin oxide (ITO), but the implementation of the invention is not limited thereto. In the embodiment, the first asymmetric protrusion 113 and the first electrode layer 115 are integrated integrally into one asymmetric protruded electrode. Thus, the asymmetric protruded electrode may achieve both effects provided by the first asymmetric protrusion 113 and the first electrode layer 115, and the manufacturing process can be further simplified.

In an embodiment as indicated in FIG. 4B, the second substrate 120' may include a second base 121, a third asymmetric protrusion 123, and a second electrode layer 125. In an embodiment as indicated in FIG. 4B, the cross section of the first asymmetric protrusion 113 is such as an asymmetric trapezoid with two lateral sides having unequal lengths. A gap S' may be disposed between two third asymmetric protrusions 123, wherein a width L of the gap S' is between 0-10 μm, and the gap S' is disposed corresponding to where the gap S is disposed between two first asymmetric protrusions 113. In an embodiment as indicated in FIG. 4B, a structure F with a flat surface is disposed in the gap S' between two third asymmetric protrusions 123 in the areas D22 and D24. The gap S' disposed corresponding to the gap S may be used as a buffer area, so that the overall display quality of the liquid crystal display panel 10 is less affected by the assembling error between the first substrate 110 and the second substrate 120'.

In the embodiment as indicated in FIG. 4B, the first electrode layer 115 of the first substrate 110 completely covers and directly contacts the first asymmetric protrusion 113, but the implementation of the invention is not limited thereto. For example, the first electrode layer 115 may partially cover and directly contact the first asymmetric protrusion 113. In the embodiment, the liquid crystal molecules LC are such as blue phase liquid crystal molecules. As indicated in FIG. 4B, the blue phase liquid crystal molecules LC of the liquid crystal mixture 130 will be affected by the electrical field when a voltage is applied thereon and become optically anisotropic. Through suitable design of relative positions between the first asymmetric protrusion 113 and the third asymmetric protrusion 123 and shapes of the first asymmetric protrusion 113 and the third asymmetric protrusion 123, the inclination angle of the liquid crystal molecules LC may be effectively adjusted, and an angle θ is formed between the incident light and the long axis direction of the equivalent liquid crystal molecules LC. The angle θ is between 30-90°, and the closer to 90° the angle is, the better birefringence characteristics the incident light will experience. That is, a larger angle formed between the arrangement direction (the long axis direction) of the equivalent liquid crystal molecules LC and the optical path direction of the incident light makes the light experience larger birefringence. Consequently, the transmittance is increased, the operating voltage is reduced, and excellent display quality is provided.

In an embodiment, the third asymmetric protrusion 123 and the second electrode layer 125 may be formed of the same material, such as indium tin oxide (ITO), but the implementation of the invention is not limited thereto. In the embodiment, the third asymmetric protrusion 123 and the second electrode layer 125 are integrated integrally into one asymmetric protruded electrode. Thus, the asymmetric protruded electrode may achieve both effects provided by the third asymmetric protrusion 123 and the second electrode layer 125, and the manufacturing process can be further simplified.

Figure 5:
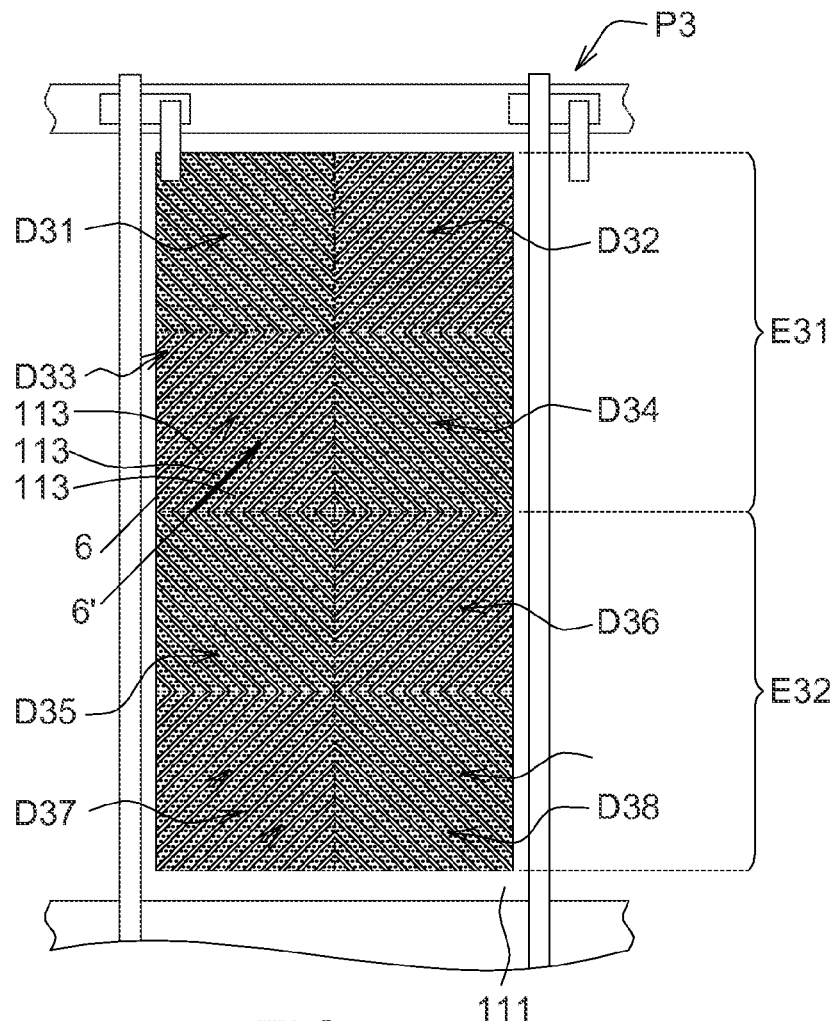
FIG. 5 shows a top view of a liquid crystal display panel according to an alternate embodiment of the invention.
Figure 6A:
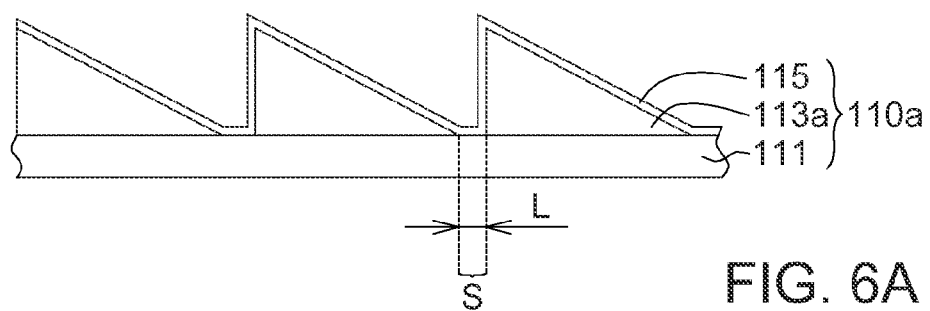
FIGS. 6A-6C are cross-sectional views of a first substrate along a cross-sectional line 6-6' of FIG. 5.
Figure 6B:
Figure 6C:
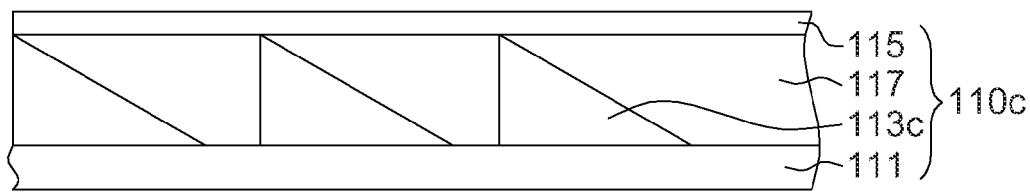
Figure 7:
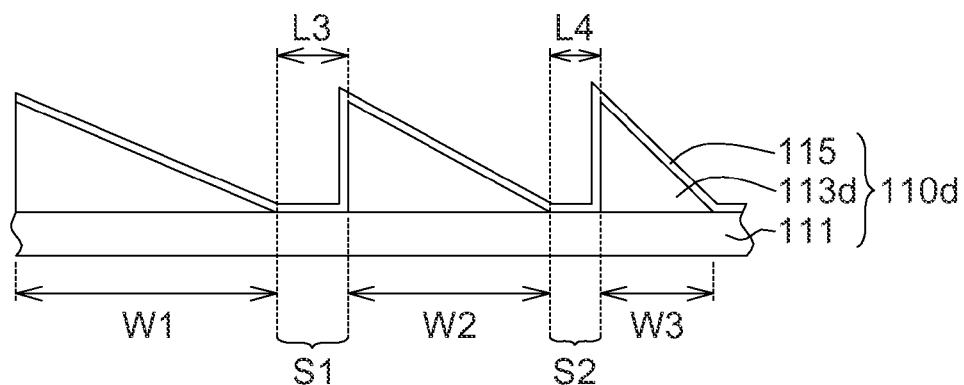
FIG. 7 shows a cross-sectional view of a first substrate according to an alternate embodiment of the invention.

Referring to FIGS. 5, 6A-6C and 7. FIG. 5 shows a top view of a liquid crystal display panel according to an alternate embodiment of the invention. FIGS. 6A-6C are cross-sectional views of a first substrate along a cross-sectional line 6-6' of FIG. 5. FIG. 7 shows a cross-sectional view of a first substrate according to an alternate embodiment of the invention. As indicated in FIG. 5, the first base 111 has a plurality of sub pixels. For example, the sub pixel P3 has electrode units E31 and E32. The electrode unit E31 includes a plurality of areas D31-D34, and the electrode unit E32 includes a plurality of areas D35-D38. The length and the width of each area both are between 100-400 μm, but the implementation of the invention is not limited thereto.

As indicated in FIG. 5 (please also refer to FIG. 6A), the first substrate includes a first base 111, a plurality of first asymmetric protrusions 113, and a first electrode layer 115. The first asymmetric protrusions are disposed in the area of the first base 111, and the first electrode layer 115 is disposed on the first asymmetric protrusions. In an embodiment as indicated in FIG. 5, a plurality of first asymmetric protrusions 113 are formed in the area D33 of the first base 111.

In an embodiment as indicated in FIG. 6A, the cross section of the first asymmetric protrusion 113a is such as a right triangle arranged on the first base 111 to form a prism structure. The size of the liquid crystal molecules LC is far smaller than that of an area. Therefore, as indicated in FIG. 5 and FIG. 6A, the design of collocating a plurality of first asymmetric protrusions 113a disposed in an area collocated with different designs of electrodes and incident lights of different directions effectively makes the incident light pass through the liquid crystal molecules LC in a direction approximately perpendicular to the long axis direction of the liquid crystal molecules LC. That is, a larger angle is formed between the arrangement direction (the long axis direction) of the equivalent liquid crystal molecules LC and the optical path direction of the incident light, so that the transmittance is increased, the operating voltage is reduced, and excellent display quality is provided.

In an embodiment, a gap S is located between every two first asymmetric protrusions 113a, wherein a width L of the gap S is between 0-10 μm. Referring to FIG. 5 and FIG. 6A, in an embodiment, the gap S between two first asymmetric protrusions 113a in the area D33 exposes a part of a surface of the first base 111. The gap S may be used as a buffer area, so that the overall display quality of the liquid crystal display panel 10 is less affected by the assembling error between the first substrate 110a and the second substrate.

In the embodiment as indicated in FIG. 6A, the first electrode layer 115 of the first substrate 110a completely covers and directly contacts the first asymmetric protrusions 113a, but the implementation of the invention is not limited thereto. For example, the first electrode layer 115 may partially cover and directly contact the first asymmetric protrusion 113a.

In the embodiment, the first asymmetric protrusion 113a and the first electrode layer 115 may be formed of the same material, such as indium tin oxide (ITO), but the implementation of the invention is not limited thereto. In the embodiment, the first asymmetric protrusion 113a and the first electrode layer 115 are integrated integrally into one asymmetric protruded electrode. Thus, the asymmetric protruded electrode may achieve both effects provided by the first asymmetric protrusion 113a and the first electrode layer 115, and the manufacturing process can be further simplified.

In the embodiment as indicated in FIG. 6B, the cross section of the first asymmetric protrusion 113b of the first substrate 110b is such as an asymmetric arcs projected from the top surface of the asymmetric protrusion. A partial arc starting from the highest point to one end of the first asymmetric protrusion 113b and another partial arc starting from the highest point to the other end of the first asymmetric protrusion 113b respectively produce a projection with length C1 and a projection with length C2 on the bottom of the first asymmetric protrusion 113b, wherein the length C1 is not equal to the length C2. In other words, the slopes of two lateral sides of an asymmetric arc are not the same. In the embodiment, the value of the ratio C1/C2 is about 0.25. In the embodiment as indicated in FIG. 6B, the first electrode layer 115 completely covers and directly contacts the first asymmetric protrusions 113b, but the implementation of the invention is not limited thereto. For example, the first electrode layer 115 may partially cover and directly contact the first asymmetric protrusion 113b.

In the embodiment, the first asymmetric protrusion 113b and the first electrode layer 115 may be formed of the same material, such as indium tin oxide (ITO), but the implementation of the invention is not limited thereto. In the embodiment, the first asymmetric protrusion 113b and the first electrode layer 115 are integrated integrally into one asymmetric protruded electrode. Thus, the asymmetric protruded electrode may achieve both effects provided by the first asymmetric protrusion 113b and the first electrode layer 115, and the manufacturing process can be further simplified.

In an embodiment as indicated in FIG. 6C, the first substrate 110c includes a first base 111, a plurality of first asymmetric protrusions 113c, a first electrode layer 115, and a first planarized layer 117. The first planarized layer 117 is disposed on the first asymmetric protrusions 113c, and the first electrode layer 115 is disposed on the first planarized layer 117. In the embodiment, the index of refraction of the first planarized layer 117 and the index of refraction of the first asymmetric protrusion 113c are different. In the embodiment as indicated in FIG. 6C, the first electrode layer 115 completely covers and directly contacts the first planarized layer 117, but the implementation of the invention is not limited thereto. For example, the first electrode layer 115 may partially cover the first planarized layer 117.

In an embodiment as indicated in FIG. 7, the cross section of the first asymmetric protrusions 113d of the first substrate 110d is such as a right triangle, and the first asymmetric protrusions 113d are arranged on the first base 111 to form a prism structure. The first asymmetric protrusion 113d may have different widths ranging between 0-1000 μm. A gap S is disposed between two first asymmetric protrusions 113d, and the gaps S may have different widths ranging between 0-20 μm. The maximum height H of the first asymmetric protrusion 113d is between 0.1-10 μm. In an embodiment, of the widths of the first asymmetric protrusions 113d, a width W1 is larger than a width W2, and the width W2 is larger than a width W3. In an embodiment, the width W1 is such as 7.5 μm, the width W2 is such as 4 μm, and the width W3 is such as smaller than 4 μm. The gap S1 and the gap S2 are located between the first asymmetric protrusions 113d, wherein the width L3 of the gap S1 is larger than the width L4 of the gap S2. In the embodiment, the width L3 is such as 4 μm, and the width L4 is such as 0.5 μm. Referring to FIG. 7, in the embodiment, the gap S disposed between two first asymmetric protrusions 113d exposes a part of a surface of the first base 111.

In an embodiment, the first asymmetric protrusion 113d and the first electrode layer 115 may be formed of the same material, such as indium tin oxide (ITO), but the implementation of the invention is not limited thereto. In the embodiment, the first asymmetric protrusion 113d and the first electrode layer 115 are integrated integrally into one asymmetric protruded electrode. Thus, the asymmetric protruded electrode may achieve both effects provided by the first asymmetric protrusion 113d and the first electrode layer 115, and the manufacturing process can be further simplified.

Figure 8:
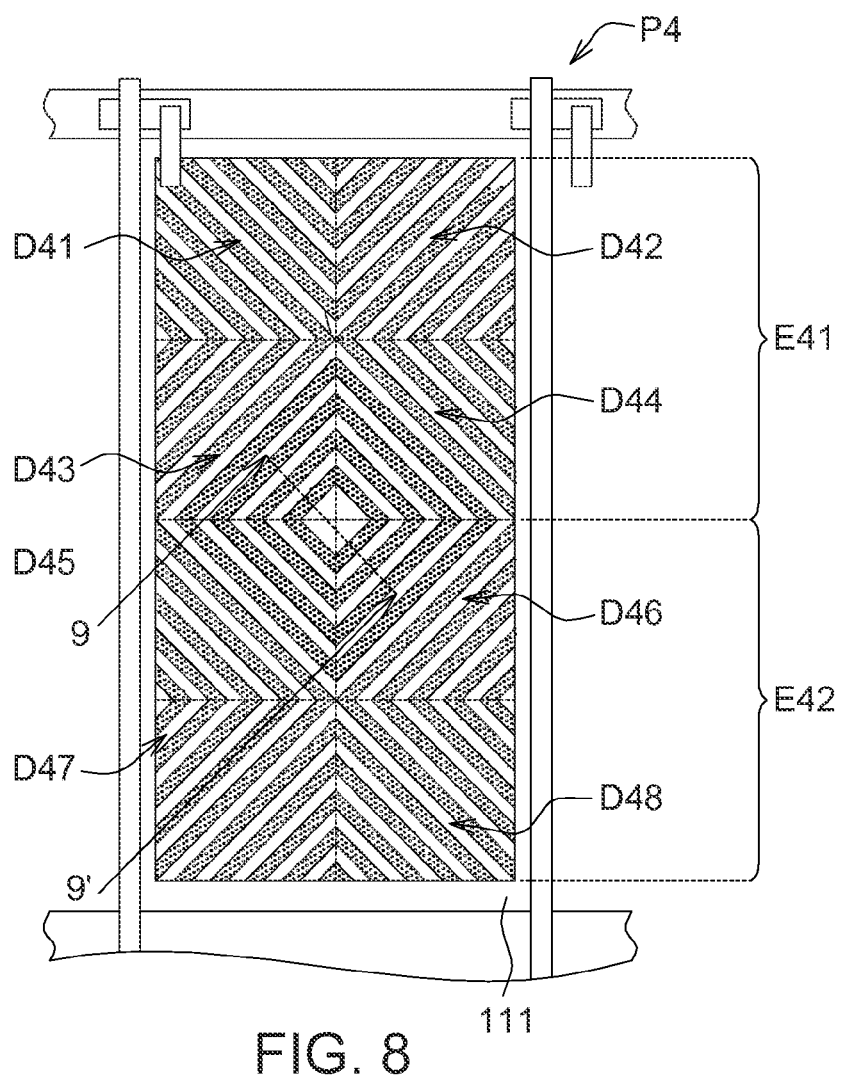
FIG. 8 shows a top view of a liquid crystal display panel according to another alternate embodiment of the invention.

Referring to FIG. 8 and FIGS. 9A-9F. FIG. 8 shows a top view of a liquid crystal display panel according to another alternate embodiment of the invention. FIGS. 9A-9F shows a cross-sectional view along a cross-sectional line 9-9' of FIG. 8. As indicated in FIG. 8, the first base 111 has a plurality of sub pixels. For example, a sub pixel P4 has electrode units E41 and E42. In the embodiment, the electrode unit E41 includes a plurality of areas D41-D44, and the electrode unit E42 includes a plurality of areas D45-D48. The length and width of each area both are between 100-400 μm, but the implementation of the invention is not limited thereto.

Figure 9A:
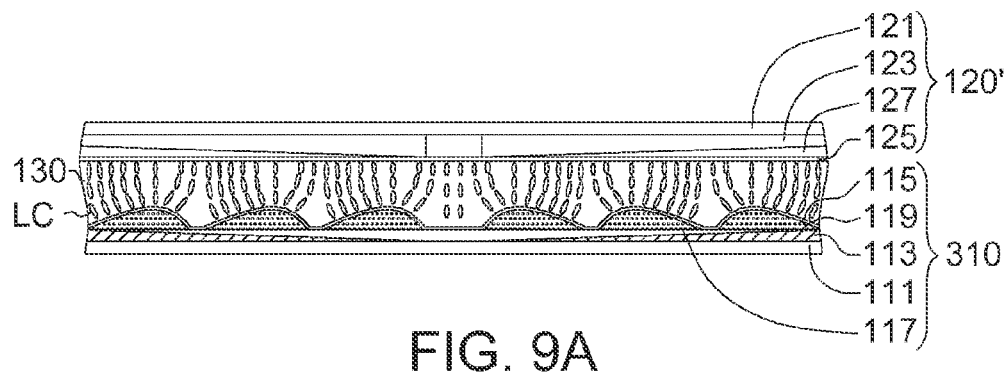
FIGS. 9A-9F are cross-sectional views along a cross-sectional line 9-9' of FIG. 8.

As indicated in FIG. 8 and FIG. 9A, the liquid crystal display panel 10 includes a first substrate 310, a second substrate 120', and a liquid crystal mixture 130. The second substrate 120' is assembled to the first substrate 310. The first substrate 310 includes a first base 111, a first asymmetric protrusion 113, a first electrode layer 115, and a second asymmetric protrusion 119. The second asymmetric protrusion 119 is disposed on the first asymmetric protrusion 113, and the first electrode layer 115 is disposed on the second asymmetric protrusion 119. The second substrate 120' includes a second base 121, a third asymmetric protrusion 123, and a second electrode layer 125.

In an embodiment, the number, shape and arrangement of the first asymmetric protrusion 113 and that of the third asymmetric protrusion 123 may be realized by one or a combination of the implementations of the above embodiments. In addition, the first planarized layer 117 may further be disposed on the first asymmetric protrusion 113, the second planarized layer 127 may further be disposed on the third asymmetric protrusion 123, and the similarities are not repeated here. The implementation and selection of the above elements may be adjusted according to practical applications, and the invention is not limited thereto.

In the embodiment, the cross section of the second asymmetric protrusion 119 is such as an asymmetric triangle with two lateral sides having unequal lengths, an asymmetric trapezoid with two lateral sides having unequal lengths, an asymmetric polygon, or an asymmetric arc projected from the top surface of the asymmetric protrusion. As indicated in FIG. 9A, the cross section of the second asymmetric protrusion 119 is such as an asymmetric arc projected from the top surface of the asymmetric protrusion.

In an embodiment as indicated in FIG. 9A, the first electrode layer 115 of the first substrate 310 completely covers and directly contacts the second asymmetric protrusion 119. In the embodiment as indicated in FIG. 9A, every three second asymmetric protrusions 119 are disposed on a first asymmetric protrusion 113. In the embodiment, the liquid crystal molecules LC are such as blue phase liquid crystal molecules. The blue phase liquid crystal molecules LC of the liquid crystal mixture 130 are optically isotropic when no voltage is applied thereon. As indicated in FIG. 9A, the blue phase liquid crystal molecules LC of the liquid crystal mixture 130 will be affected by the electrical field when a voltage is applied thereon and become optically anisotropic. Furthermore, the long axis of the equivalent liquid crystal molecules LC affected by the electrical field will be arranged in a direction parallel to the direction of the electrical field generated by the first electrode layer 115 and the second electrode layer 125, and the liquid crystal molecules LC will be distributed between the first electrode layer 115 and the second electrode layer 125. The inclination angle of the liquid crystal molecules LC is effectively adjusted through the structural design of the second asymmetric protrusion 119. Moreover, the refraction angle of the incident light is adjusted by adjusting the magnitude of the index of refraction of the first planarized layer 117 and the index of refraction of the first asymmetric protrusion 113, the numeric relationships between the indices of refraction, and the optical path direction of the incident light from the backlight source. Thus, the incident light may pass through the liquid crystal molecules in a direction approximately perpendicular to the long axis direction of the liquid crystal molecules LC, so that the incident light may experience better birefringence characteristics. That is, a larger angle is formed between the arrangement direction (the long axis direction) of the equivalent liquid crystal molecules LC and the optical path direction of the incident light, so that the incident light experiences larger birefringence. Consequently, the transmittance is increased, the operating voltage is reduced, and excellent display quality is provided. In the embodiment, when viewed from atop of the panel, the arrangement direction of the first asymmetric protrusions 113 is parallel to the arrangement direction of the second asymmetric protrusions 119. If the design of optical path makes the light inclinedly enter the liquid crystal mixture 130 in a top-view panel direction approximately perpendicular to the arrangement directions of to the first asymmetric protrusion 113 and the second asymmetric protrusion 119, the incident light may pass through the liquid crystal molecules LC in a direction approximately perpendicular to the long axis direction of the liquid crystal molecules LC. In the embodiment, when viewed from atop of the panel, an angle may also be formed between the arrangement direction of the first asymmetric protrusions 113 and the arrangement direction of the second asymmetric protrusions 119. For example, an angle of 90° is formed between the arrangement direction of the first asymmetric protrusions 113 and the arrangement direction of the second asymmetric protrusions 119. The design of optical path makes the light inclinedly enter the liquid crystal mixture 130 in a top-view direction approximately perpendicular to the arrangement direction of the first asymmetric protrusions 113.

In the embodiment, the second asymmetric protrusion 119 and the first electrode layer 115 may be formed of the same material, such as indium tin oxide (ITO), but the implementation of the invention is not limited thereto. In the embodiment, when the second asymmetric protrusion 119 and the first electrode layer 115 are formed of the same material, the second asymmetric protrusion 119 and the first electrode layer 115 may be formed in one manufacturing process, so that the second asymmetric protrusion 119 and the first electrode layer 115 are integrated integrally into one asymmetric protruded electrode. Thus, the asymmetric protruded electrode may achieve both effects provided by the second asymmetric protrusion 119 and the first electrode layer 115, and the manufacturing process can be further simplified.

Figure 9B:
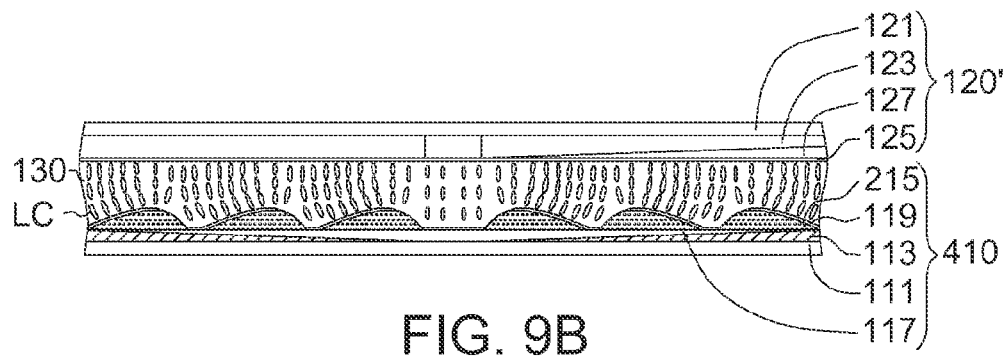

In an embodiment as indicated in FIG. 9B, the first electrode layer 215 of the first substrate 410 partially covers and directly contacts the second asymmetric protrusion 119. In the embodiment as indicated in FIG. 9B, every three second asymmetric protrusions 119 are disposed on a first asymmetric protrusion 113. In the embodiment, the liquid crystal molecules LC are such as blue phase liquid crystal molecules. The blue phase liquid crystal molecules LC of the liquid crystal mixture 130 are optically isotropic when no voltage is applied thereon, and the blue phase liquid crystal molecules LC are arranged on the first base 410 along the shape of the second asymmetric protrusion 119. When a voltage is applied as indicated in FIG. 9B, the blue phase liquid crystal molecules LC of the liquid crystal mixture 130 will be affected by the electrical field and become optically anisotropic. Furthermore, the long axis of the equivalent liquid crystal molecules LC affected by the electrical field will be arranged in a direction parallel to the direction of the electrical field generated by the first electrode layer 215 and the second electrode layer 125, and the liquid crystal molecules LC of the liquid crystal mixture 130 will be distributed between the first electrode layer 215 and the second electrode layer 125. Through the selections of positions of the second asymmetric protrusion 119 where the first electrode 215 covers, the optical properties of the liquid crystal molecules LC are affected, and excellent display quality can thus be achieved.

Figure 9C:
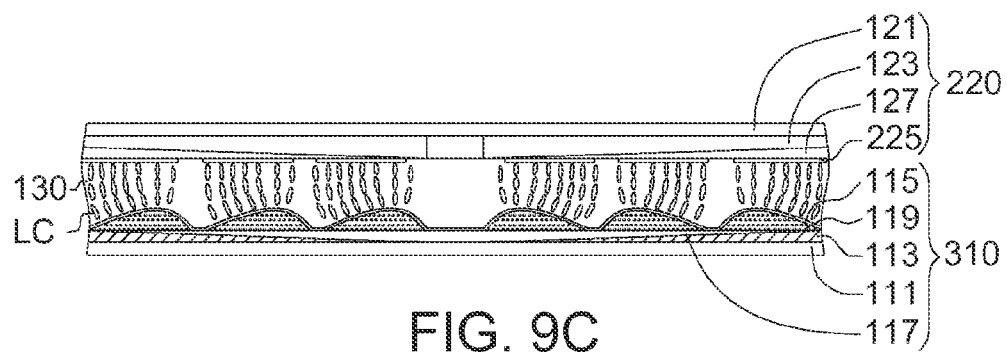

In an embodiment as indicated in FIG. 9C, the second electrode layer 225 of the second substrate 220 partially covers the third asymmetric protrusion 123, the first electrode layer 115 completely covers and directly contacts the second asymmetric protrusion 119. In the embodiment, the liquid crystal molecules LC are such as blue phase liquid crystal molecules. The blue phase liquid crystal molecules LC of the liquid crystal mixture 130 are optically isotropic when no voltage is applied thereon, and the blue phase liquid crystal molecules LC are arranged on the first base 310 along the shape of the second asymmetric protrusion 119. When a voltage is applied as indicated in FIG. 9C, the blue phase liquid crystal molecules LC of the liquid crystal mixture 130 will be affected by the electrical field and become optically anisotropic. Furthermore, the long axis of the equivalent liquid crystal molecules LC affected by the electrical field will be arranged in a direction parallel to the direction of the electrical field generated by the first electrode layer 115 and the second electrode layer 225, and the liquid crystal molecules LC will be distributed between the first electrode layer 115 and the second electrode layer 225. Through the selections of positions of the third asymmetric protrusion 123 covered by the second electrode layer 125, the distribution of the electrical field is affected, the optical properties of the liquid crystal molecules LC are improved, and excellent display quality can thus be achieved.

In the embodiment, the second asymmetric protrusion 119 and the first electrode layer 115 may be formed of the same material, such as indium tin oxide (ITO), but the implementation of the invention is not limited thereto. In an embodiment, the second asymmetric protrusion 119 and the first electrode layer 115 are integrated integrally into one asymmetric protruded electrode. Thus, the asymmetric protruded electrode may achieve both effects provided by the second asymmetric protrusion 119 and the first electrode layer 115, and the manufacturing process can be further simplified.

Figure 9D:
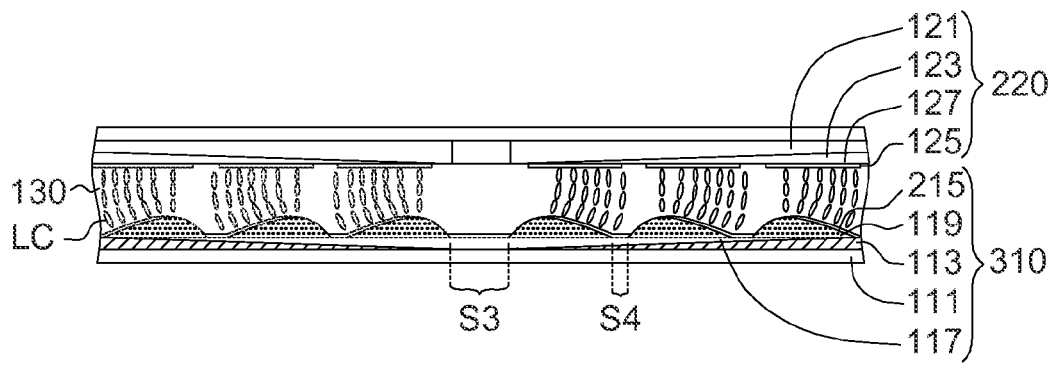

In an embodiment as indicated in FIG. 9D, the second electrode layer 225 of the second substrate 220 partially covers the third asymmetric protrusion 123, and the first electrode layer 215 partially covers and directly contacts the second asymmetric protrusion 119. In the embodiment, the liquid crystal molecules LC are such as blue phase liquid crystal molecules. The blue phase liquid crystal molecules LC of the liquid crystal mixture 130 are optically isotropic when no voltage is applied thereon, and the blue phase liquid crystal molecules LC are arranged on the first base 310 along the shape of the second asymmetric protrusion 119. When a voltage is applied as indicated in FIG. 9D, the blue phase liquid crystal molecules LC of the liquid crystal mixture 130 will be affected by the electrical field and become optically anisotropic. Furthermore, the long axis of the equivalent liquid crystal molecules LC affected by the electrical field will be arranged in a direction parallel to the direction of the electrical field generated by the first electrode layer 215 and the second electrode layer 225, and the liquid crystal molecules LC will be distributed between the first electrode layer 215 and the second electrode layer 225. Through suitable design of relative positions between the first electrode layer 215 and the second electrode layer 225 and suitable design of shapes of and relative positions between of the first asymmetric protrusion 113 and the second asymmetric protrusion 119, the incident light may pass through the liquid crystal molecules in a direction approximately perpendicular to the long axis direction of the liquid crystal molecules LC, so that the incident light may experience better birefringence characteristics. That is, a larger angle formed between the arrangement direction (the long axis direction) of the equivalent liquid crystal molecules LC and the optical path direction of the incident light makes the incident light experience larger birefringence, so that the transmittance is increased, the operating voltage is reduced, and excellent display quality is provided.

In the embodiment, a gap may be located between every two second asymmetric protrusions 119, and the gaps may have different widths. In the embodiment as indicated in FIG. 9D, a width of the gap S3 is larger than a width of the gap S4. The gaps S3 and S4 may be used as buffer areas, so that the overall display quality of the liquid crystal display panel 10 is less affected by the assembling error between the first substrate 110 and the second substrate 120.

Figure 9E:
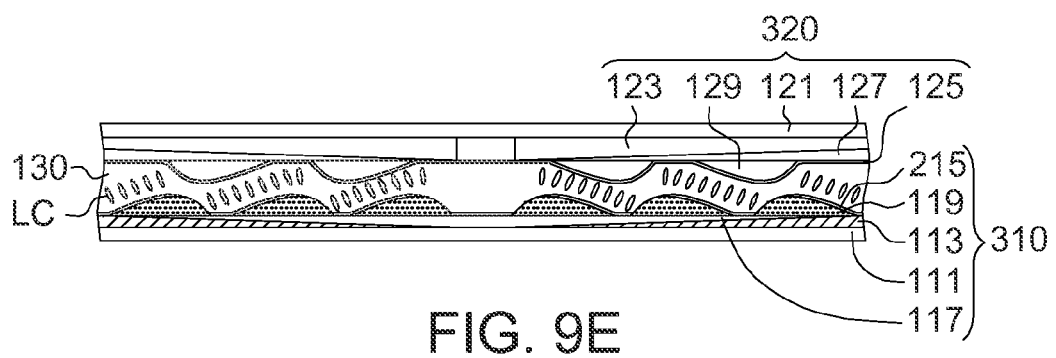

In an embodiment as indicated in FIG. 9E, the second substrate 320 includes a second base 121, a third asymmetric protrusion 123, a fourth asymmetric protrusion 129, and a second electrode layer 125. The fourth asymmetric protrusion 129 is disposed on the third asymmetric protrusion 123. The second electrode layer 225 completely covers and directly contacts the fourth asymmetric protrusion 129. The first electrode layer 215 partially covers and directly contacts the second asymmetric protrusion 119. In an embodiment, the liquid crystal molecules LC are such as blue phase liquid crystal molecules. The blue phase liquid crystal molecules LC of the liquid crystal mixture 130 are optically isotropic when no voltage is applied thereon, and the blue phase liquid crystal molecules LC are arranged on the first base 410 along the shapes of the second asymmetric protrusion 119 and the fourth asymmetric protrusion 129. When a voltage is applied as indicated in FIG. 9E, the blue phase liquid crystal molecules LC of the liquid crystal mixture 130 will be affected by the electrical field and become optically anisotropic. Furthermore, the long axis of the equivalent liquid crystal molecules LC affected by the electrical field will be arranged in a direction parallel to the direction of the electrical field generated by the first electrode layer 215 and the second electrode layer 125, and the liquid crystal molecules LC will be distributed between the first electrode layer 215 and the second electrode layer 125. Through suitable design of relative positions between the second asymmetric protrusion 119 and the fourth asymmetric protrusion 129 and suitable design of shapes of the second asymmetric protrusion 119 and the fourth asymmetric protrusion 129, the inclination angle of the liquid crystal molecules LC may be effectively adjusted. Moreover, the refraction angle of the incident light is adjusted by adjusting the magnitudes of the index of refraction of the first planarized layer 117 and the index of refraction of the first asymmetric protrusion 113 and the numeric relationships between the indices of refraction. Thus, an angle θ is formed between the incident light and the long axis of the equivalent liquid crystal molecules LC. The angle θ is between 30-90°, and the closer to 90° the angle is, the better birefringence characteristics the incident light will experience, so that the transmittance is increased, the operating voltage is reduced, and excellent display quality is provided.

In the embodiment, the fourth asymmetric protrusion 129 and the second electrode layer 125 may be formed of the same material, such as indium tin oxide (ITO), but the implementation of the invention is not limited thereto. In the embodiment, when the fourth asymmetric protrusion 129 and the second electrode layer 125 are formed of the same material, the fourth asymmetric protrusion 129 and the second electrode layer 125 may be formed in one manufacturing process, so that the fourth asymmetric protrusion 129 and the second electrode layer 125 are integrated integrally into one asymmetric protruded electrode. Thus, the asymmetric protruded electrode may achieve both effects provided by the fourth asymmetric protrusion 129 and the second electrode layer 125, and the manufacturing process can be further simplified.

Figure 9F:
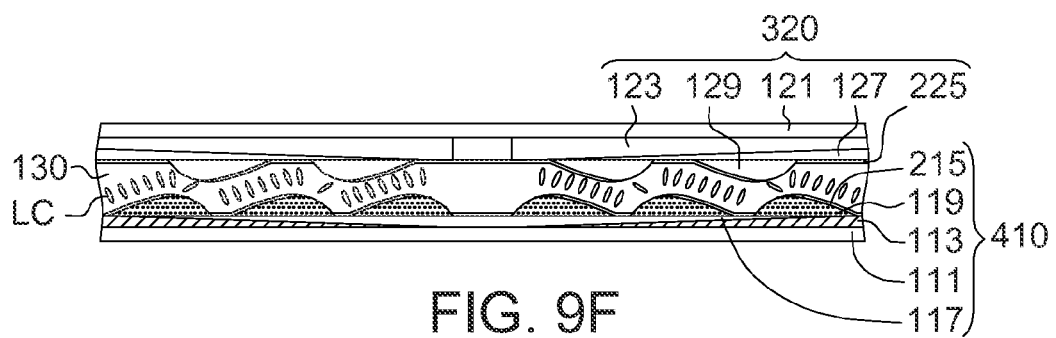

In an embodiment as indicated in FIG. 9F, the second substrate 420 includes a second base 121, a third asymmetric protrusion 123, a fourth asymmetric protrusion 129, and a second electrode layer 225. The second electrode layer 225 partially covers and directly contacts the fourth asymmetric protrusion 129, and the first electrode layer 215 partially covers and directly contacts the second asymmetric protrusion 119. In the embodiment, the liquid crystal molecules LC are such as blue phase liquid crystal molecules. The blue phase liquid crystal molecules LC of the liquid crystal mixture 130 are optically isotropic when no voltage is applied thereon and are arranged on the first base 410 along the shapes of the second asymmetric protrusion 119 and the fourth asymmetric protrusion 129. When a voltage is applied as indicated in FIG. 9F, the blue phase liquid crystal molecules LC of the liquid crystal mixture 130 will be affected by the electrical field and become optically anisotropic. Furthermore, the long axis of the equivalent liquid crystal molecules LC affected by the electrical field will be arranged in a direction parallel to the direction of the electrical field generated by the first electrode layer 215 and the second electrode layer 225, and the liquid crystal molecules LC will be distributed between the first electrode layer 215 and the second electrode layer 125. Through suitable design of relative positions between the first electrode layer 215 and the second electrode layer 225, shapes of and relative positions between the first asymmetric protrusion 113 and the second asymmetric protrusion 119, and shapes of and relative positions between the second asymmetric protrusion 119 and the fourth asymmetric protrusion 129, an angle θ is formed between the incident light and the long axis of the equivalent liquid crystal molecules LC. The angle θ is between 30-90°, and the closer to 90° the angle is, the better birefringence characteristics the incident light will experience, so that the incident light may experience better birefringence characteristics. That is, a larger angle formed between the arrangement direction (the long axis direction) of the equivalent liquid crystal molecules LC and the optical path direction of the incident light makes the incident light experience larger birefringence, so that the transmittance is increased, the operating voltage is reduced, and excellent display quality is provided.

The results of optical paths obtained according to a number of embodiments of the invention are provided. However, anyone who is skilled in the technology of the invention will understand that the invention is not limited to the following implementations, and suitable modifications and variations can be made according to actual needs.

Figure 10A:
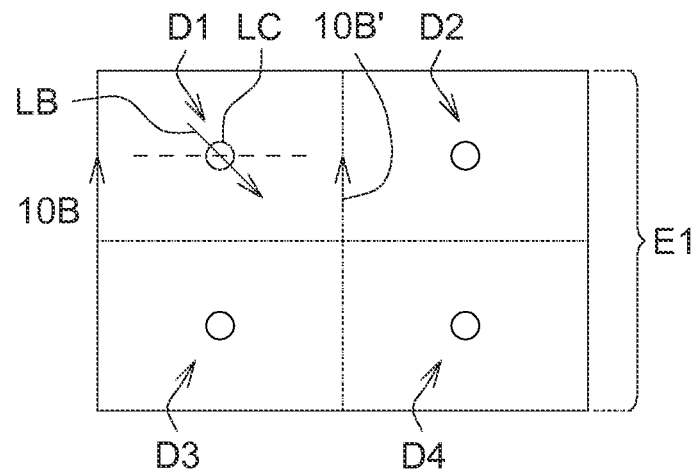
FIG. 10A shows a partial top view of an optical path in a liquid crystal display panel of an embodiment of the invention.
Figure 10B:
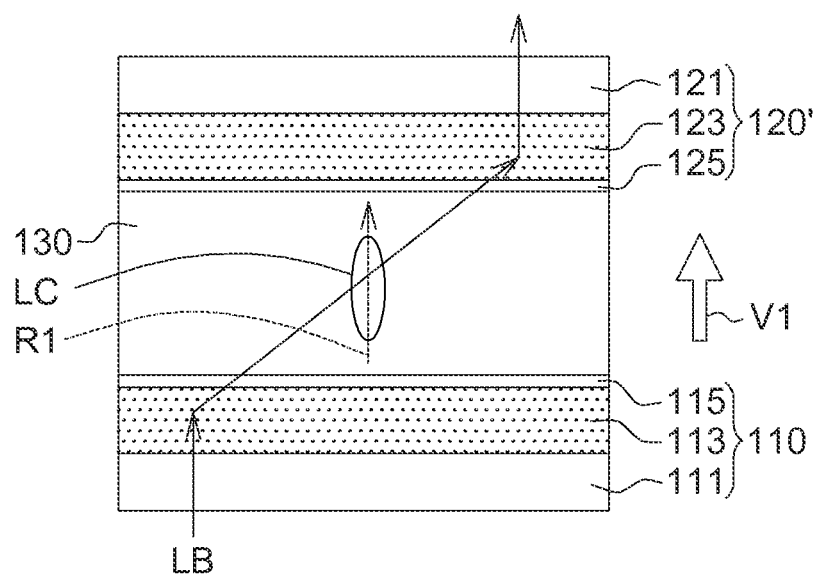
FIG. 10B shows a cross-sectional view along a cross-sectional line 10B-10B' of FIG. 10A.

FIG. 10A shows a partial top view of an optical path in a liquid crystal display panel of an embodiment of the invention. FIG. 10B shows a cross-sectional view along a cross-sectional line 10B-10B' of FIG. 10A. As indicated in FIG. 10A, an electrode unit E1 in the sub pixel of the first base 111 includes a plurality of areas D1-D4. It is noted that the drawings of the first asymmetric protrusion 113, the third asymmetric protrusion 123 and the liquid crystal molecules LC as illustrated in FIGS. 10A-10B are simplified for the convenience of elaborating the embodiments of the invention.

In an embodiment, the liquid crystal mixture 130 is such as a blue phase liquid crystal mixture, the liquid crystal display panel 10 is such as a vertical field switch liquid crystal panel, and the electrodes are respectively disposed on the substrates located at two opposite sides of the liquid crystal mixture layer. The blue phase liquid crystal is optically isotropic when no voltage is applied thereon. When a voltage is applied, the equivalent blue phase liquid crystal will be extended along the direction of the electrical field (the long axis direction of the liquid crystal molecules is formed) and becomes optically anisotropic. When a voltage is applied, the blue phase liquid crystal is optically isotropic and does not have birefringence characteristics if the direction of the incident light is parallel to the direction of the electrical field (the extending direction of the blue phase liquid crystal); alternatively, the blue phase liquid crystal is optically anisotropic if the direction of the incident light is not parallel to the direction of the electrical field. The incident light may experience the largest birefringence characteristics when the direction of the incident light is perpendicular to the direction of the electrical field. In other words, when no voltage is applied or when a voltage is applied but the incident light is parallel to the direction of the electrical field, the blue phase liquid crystal does not create phase retardation of the incident light, and the blue phase liquid crystal display panel shows a dark state in a normally black display mode.

As indicated in FIG. 10A and FIG. 10B, the light LB enters in a direction perpendicular to the surface of the first base 111, that is, in a direction parallel to the direction of the electrical field V1. The direction of the electrical field V1 is perpendicular to the surface of the first base 111. The first asymmetric protrusion 113 being such as a prism structure deflects the incident angle of the incident light LB and makes the incident light LB deflectively pass through the liquid crystal molecules LC, such as the blue phase liquid crystal. The long axis direction R1 of the liquid crystal molecules LC is about parallel to the direction of the electrical field V1. The larger the deflection angle of the incident light LB is, the larger the angle formed between the deflected incident light LB and the long axis direction R1 of the liquid crystal molecules LC will be, and the easier the incident light LB may pass through the liquid crystal molecules with a relatively large angle between the optical path of the incident light LB and the long axis R1 of the liquid crystal molecules LC. That is, an angle θ is formed between the arrangement direction (the long axis direction R1) of the equivalent liquid crystal molecules LC and the optical path direction of the incident light LB. The angle θ is between 30-90°, and the closer to 90° the angle is, the better birefringence the incident light LB will experience, and the transmittance is increased accordingly. Next, after the light LB inclinedly passes through the liquid crystal molecules LC, the light LB is deflected by the third asymmetric protrusion 123 to be emitted from the liquid crystal display panel and proceed towards a predetermined direction. In different areas D1-D4, the structures of the first asymmetric protrusion 113 and the third asymmetric protrusion 123 may be respectively adjusted to provide different predetermined deflection angles for different lights LB. As such, even if the predetermined deflection angles are different in different areas, the transmittance is increased, the operating voltage is reduced, and excellent display quality is provided.

In other words, in different areas of the sub pixel of the liquid crystal display panel, the deflection angle of the incident light is changed through the adjustment in the structure of the first asymmetric protrusion 113 according to the above methods, so that a large angle is formed between the deflection direction of the incident light and the direction of electrical field (the long axis direction of liquid crystal molecules). Therefore, in terms of a single area, an inclinedly light enters the liquid crystal area, such that the optical path of the incident light may pass through a longer distance in the liquid crystal area, accordingly, more phase retardation is accumulated, the transmittance is increased, and the required operating voltage is reduced. Meanwhile, the deflection angle of outgoing (emitted) light is changed through the adjustment in the structure of the third asymmetric protrusion 123 according to the above methods. As such, regardless of the predetermined display angle at which the light is emitted from the liquid crystal panel being large (the light is deflected to a large angle area) or small (the light is focused at a small angle area in the middle), the light after having been emitted from the liquid crystal panel still maintains at a predetermined display angle. Thus, even when the predetermined deflection angles of lights in different areas of the sub pixel of the liquid crystal display panel are different, high transmittance and excellent wide viewing angle still can be achieved.

Figure 11A:
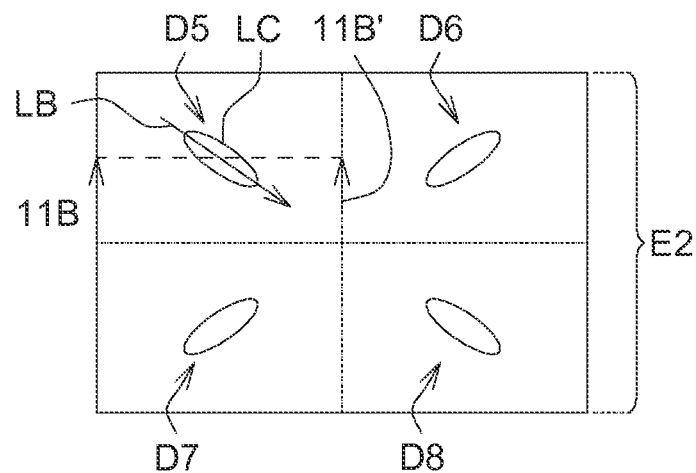
FIG. 11A shows a partial top view of an optical path in a liquid crystal display panel of another embodiment of the invention.
Figure 11B:
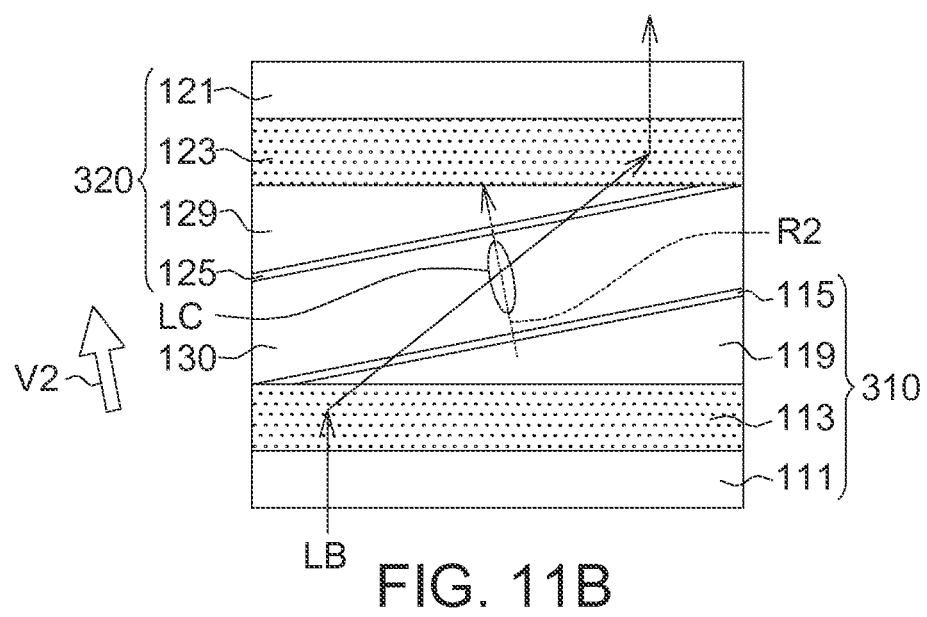
FIG. 11B shows a cross-sectional view along a cross-sectional line 11B-11B' of FIG. 11A.
Figure 12A:
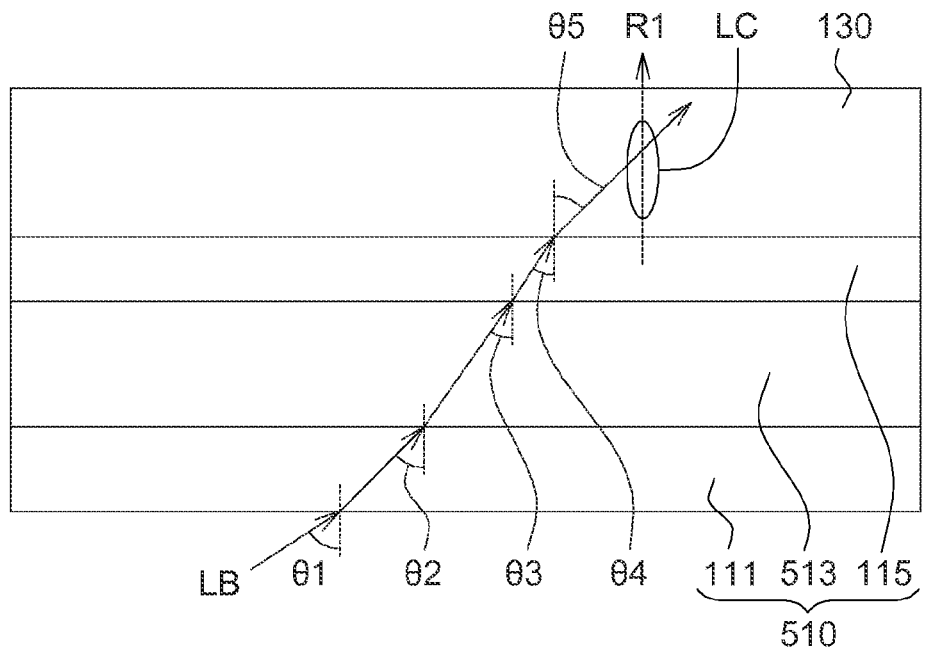
FIG. 12A shows an optical path in a substrate structure according to an embodiment of the invention.
Figure 12B:
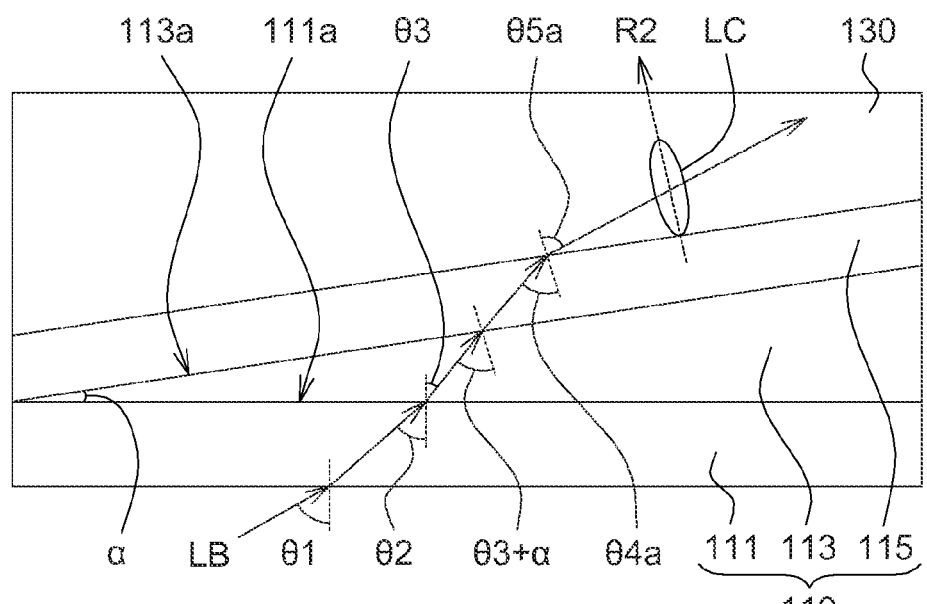
FIG. 12B shows an optical path in a substrate structure according to another embodiment of the invention.

FIG. 11A shows a partial top view of an optical path in a liquid crystal display panel of another embodiment of the invention. FIG. 11B shows a cross-sectional view along a cross-sectional line 11B-11B' of FIG. 11A. As indicated in FIG. 11A, an electrode unit E2 in a sub pixel of the first base 111 includes a plurality of areas D5-D8. It is noted that, the drawings of the first asymmetric protrusion 113, the third asymmetric protrusion 123, and the liquid crystal molecules LC as illustrated in FIGS. 12A-12B are simplified for the convenience of elaborating the embodiments of the invention.

In an embodiment, the liquid crystal mixture 130 is such as a blue phase liquid crystal mixture, the liquid crystal display panel 10 is such as vertical switch liquid crystal panel, and the electrodes are respectively disposed on the substrates located at two opposite sides of the liquid crystal layer. The blue phase liquid crystal is optically isotropic when no voltage is applied thereon. The equivalent blue phase liquid crystal will be extended along the direction of the electrical field (the long axis direction of the liquid crystal molecules is formed) when a voltage is applied thereon and become optically anisotropic. When a voltage is applied and the direction of the incident light is perpendicular to the direction of the electrical field, the blue phase liquid crystal becomes optically anisotropic and may experience the largest birefringence characteristics.

As indicated in FIG. 11A and FIG. 11B, the light LB enters the liquid crystal display panel in a direction perpendicular to the surface of the first base 111. The first asymmetric protrusion 113 being such as a prism structure deflects the incident angle of the incident light LB and makes the incident light LB deflectively pass through the liquid crystal molecules LC, such as the blue phase liquid crystal. Moreover, the first electrode layer 115 is disposed on the second asymmetric protrusion 119 and parallel to an inclined surface of the second asymmetric protrusion 119, and the second electrode layer 125 is disposed on the fourth asymmetric protrusion 129 and parallel to an inclined surface of the fourth asymmetric protrusion 129. Therefore, the long axis of the equivalent liquid crystal molecules LC affected by the electrical field will be arranged in a direction parallel to the direction of an electrical field V2 generated by the first electrode layer 115 and the second electrode layer 125 oppositely arranged, and the long axis direction R2 of the liquid crystal molecules LC is approximately parallel to the direction of the electrical field V2. As such, a relatively large angle θ (even closer to 90°) is formed between the incident light LB and the long axis direction R2 of the liquid crystal molecules LC. The angle θ is between 30-90°, and the closer to 90° the angle is, the better birefringence characteristics the incident light LB will experience, and the transmittance of the incident light LB with respect to the liquid crystal molecules LC is increased accordingly. Next, after the light LB inclinedly passes through the liquid crystal molecules LC, the light LB is again deflected by the third asymmetric protrusion 123 and the fourth asymmetric protrusion 129 to be emitted from the liquid crystal display panel and proceed towards a predetermined direction. In the embodiment, if the optical path direction of the incident light LB is fixed, the design of asymmetric protrusion structure (such as the second asymmetric protrusion 119 and the fourth asymmetric protrusion 129) allows a larger angle to be formed between the arrangement direction (the long axis direction R2) of the equivalent liquid crystal molecules LC and the optical path direction of the incident light LB, so that the incident light LB experiences larger birefringence, the transmittance is increased, and the operating voltage is reduced.

Thus, in different areas of the sub pixel of the liquid crystal display panel, the arrangement direction of the long axis of the equivalent liquid crystal molecules LC is changed through the adjustment in the structures of the second asymmetric protrusion 119 and the fourth asymmetric protrusion 129. Furthermore, the deflection angle of the incident light LB is changed through the adjustment in the structures of the first asymmetric protrusion 113 and the third asymmetric protrusion 123, so that a large angle (even closer to 90°) is formed between the incident light LB and the long axis direction R2 of the liquid crystal molecules LC. That is, a larger angle formed between the arrangement direction (the long axis direction) of the equivalent liquid crystal molecules LC and the optical path direction of the incident light LB makes the incident light LB experience larger birefringence, the transmittance is increased, and the required operating voltage is reduced. In addition, regardless of the predetermined display angle at which the light is emitted from the liquid crystal panel being large (the light is deflected to a large angle area) or small (the light is focused at a small angle area in the middle), the light after having been emitted from the liquid crystal panel still maintains at a predetermined display angle. Thus, even when the predetermined deflection angles are different in different areas of the sub pixel of the liquid crystal display panel, high transmittance and excellent wide viewing angle still can be achieved.

FIG. 12A shows an optical path in a substrate structure according to an embodiment of the invention. FIG. 12B shows an optical path in a substrate structure according to another embodiment of the invention.

As indicated in FIG. 12A, the structure layer 513 of the substrate 510 is disposed on the first base 111, and the first electrode layer 115 is disposed on the structure layer 513. The index of refraction of the structure layer 513 and that of the first base 111 are different. The index of refraction of the structure layer 513 and that of the first electrode layer 115 are different. The interfaces between each two layers are planarized and approximately parallel to the surface of the first electrode layer 115, and the long axis direction R1 of the liquid crystal molecules LC is approximately perpendicular to the surface of the first electrode layer 115. As indicated in FIG. 12B, the first asymmetric protrusion 113 has an inclined surface 113a, and an angle α is formed between the inclined surface 113a and the surface 111a of the first base 111. The index of refraction of the first asymmetric protrusion 113 and the index of refraction of the first electrode layer 115 are different. The long axis direction R2 of the liquid crystal molecules LC is approximately perpendicular to the surface of the first electrode layer 115 (that is, in a direction parallel to the electrical field).

The light LB may pass through the first base 111, the inclined first asymmetric protrusion 113 (or the flat structure layer 513) and the first electrode layer 115 to enter the liquid crystal layer 130. In the process of the light LB passing through different interfaces, various incident angles and deflection angles are formed. Given that the index of refraction of the first asymmetric protrusion 113 and the index of refraction of the structure layer 513 both are n3, and the index of refraction of the liquid crystal layer 130 is n5, an expression based on the Snell's Law is expressed as:

$$n5*\sin(\theta 5a)=n3*\sin(\theta 3+\alpha)>n3*\sin(\theta 3)=n5*\sin(\theta 5).$$

In other words, the angle θ5α formed between the light LB and the long axis direction R2 of the liquid crystal molecules LC is larger than the angle θ5 formed between the light LB and the long axis direction R1 of the liquid crystal molecules LC.

The above results show that, in the first substrate 110, with the first asymmetric protrusion 113 being disposed on the surface 111a of the first base 111 adjacent to the liquid crystal layer 130, the angle between the light LB and the long axis direction of the liquid crystal molecules LC is effectively increased, such that the incident light LB may experience better birefringence characteristics. That is, a larger angle is formed between the arrangement direction (the long axis direction) of the equivalent liquid crystal molecules LC and the optical path direction of the incident light LB, so that the transmittance is increased, the operating voltage is reduced, the result of the light LB inclinedly entering the liquid crystal layer 130 is optimized, and excellent display quality is provided.

Figure 13A:
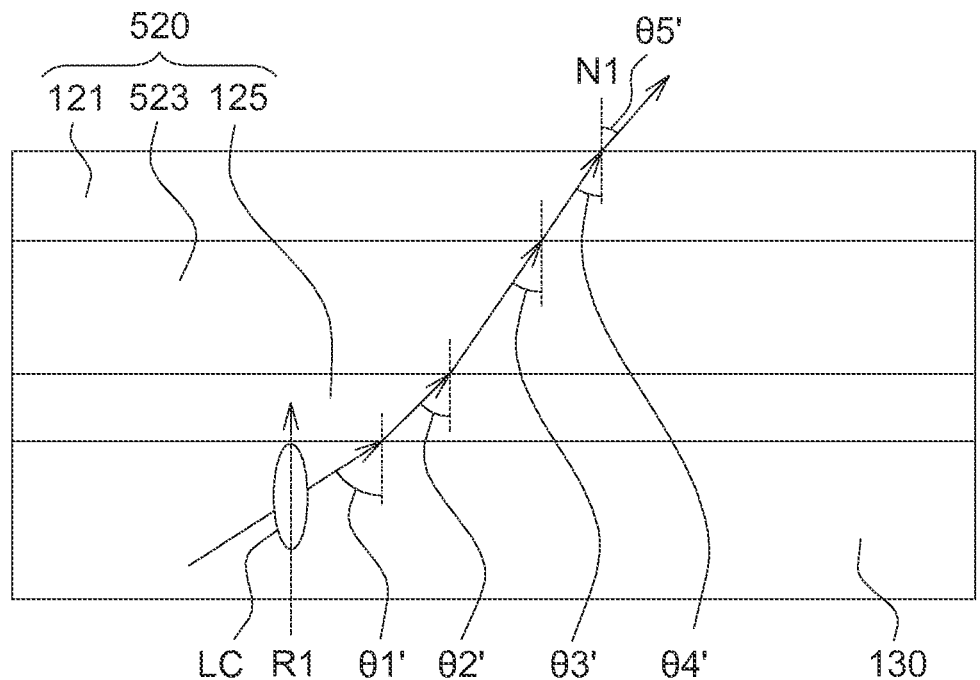
FIG. 13A shows an optical path in a substrate structure according to an alternate embodiment of the invention.
Figure 13B:
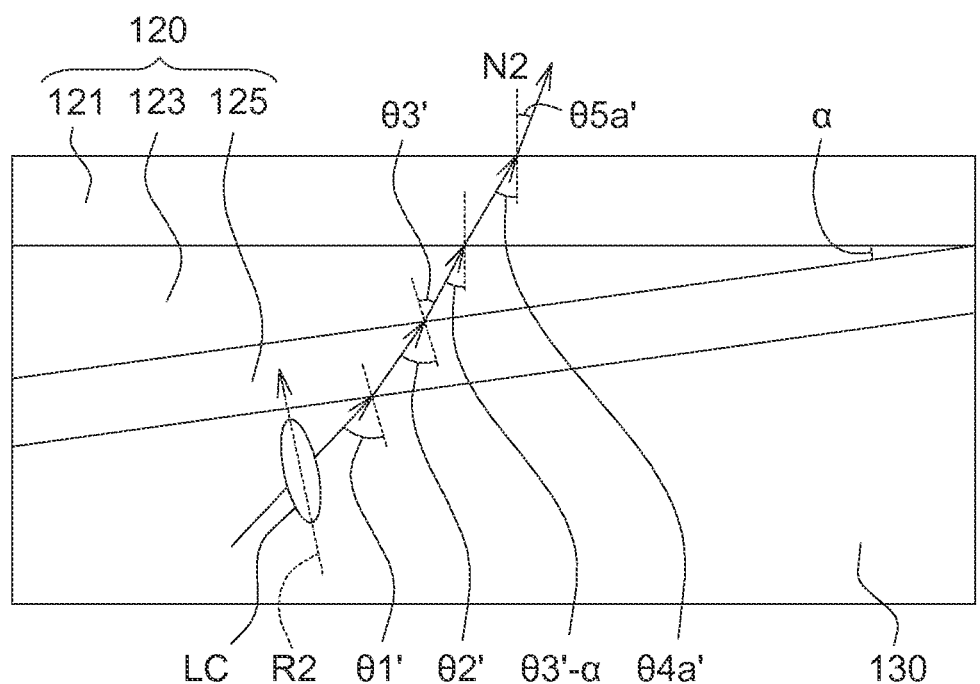
FIG. 13B shows an optical path in a substrate structure according to another alternate embodiment of the invention.

FIG. 13A shows an optical path in a substrate structure according to an alternate embodiment of the invention. FIG. 13B shows an optical path in a substrate structure according to another alternate embodiment of the invention.

As indicated in FIG. 13A, the structure layer 523 of the substrate 520 is disposed on the second base 121, the second electrode layer 125 is disposed on the structure layer 523, the index of refraction of the structure layer 523 and the index of refraction of the first base 121 are different, and the index of refraction of the structure layer 523 and the index of refraction of the second electrode layer 125 are different. The interfaces between each two layers are planarized and approximately parallel to the surface of the second electrode layer 125, and the long axis direction R1 of the liquid crystal molecules LC is approximately perpendicular to the surface of the second electrode layer 125. As indicated in FIG. 13B, the second asymmetric protrusion 123 has an inclined surface 123a, and an angle α is formed between the inclined surface 123a and the surface 121a of the second base 121. The index of refraction of the second asymmetric protrusion 123 and the index of refraction of the second electrode layer 125 are different. The long axis direction R2 of the liquid crystal molecules LC is approximately perpendicular to the surface of the second electrode layer 125 (that is, in a direction parallel to the electrical field).

The light LB emitted from the liquid crystal layer 130 may pass through the second electrode layer 125, the inclined second asymmetric protrusion 123 (or the flat structure layer 523), and the second base 121 and enters the air. In the process of the light LB passing through different interfaces, various incident angles and deflection angles are formed. Given that the index of refraction of the air is n1, the index of refraction of the second asymmetric protrusion 123 and the index of refraction of the structure layer 523 both are n3', and the index of refraction of the liquid crystal layer 130 is n5, the following expressions based on the Snell's Law are expressed as:

$$n1*\sin(\theta 1')=n3'*\sin(\theta 3')=n5*\sin(\theta 5'),$$

$$n5*\sin(\theta 5a')=n3'*\sin(\theta 3'-\alpha)<n3'*\sin(\theta 3')=n5*\sin(\theta 5').$$

In other words, the angle θ5a' formed between the light LB and the normal direction N2 of the second base 121 of the second substrate 120 is smaller than the angle θ5' formed between the light LB and the normal direction N1 of the second base 121 of the substrate 520.

The above results show that, in the second substrate 120, with the second asymmetric protrusion 123 being disposed on the surface 121a of the second base 121 adjacent to the liquid crystal layer 130, the angle between the light LB and the normal direction of the second base 121 is effectively reduced, so that the light LB can be emitted in a direction close to the normal direction of the second base 121, and a smaller angle is formed between the optical path direction of the emitted light LB and the normal direction of the second base 121. Consequently, the results of the light LB being emitted to the air in a normal direction are optimized, and excellent display quality is provided.

Figure 14A:
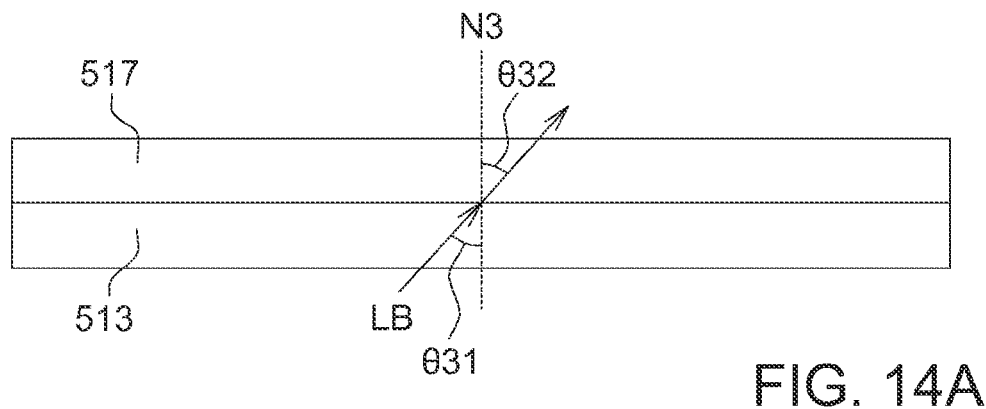
FIGS. 14A-14C show optical paths in a substrate structure with a planarized layer according to an embodiment of the invention.
Figure 14B:
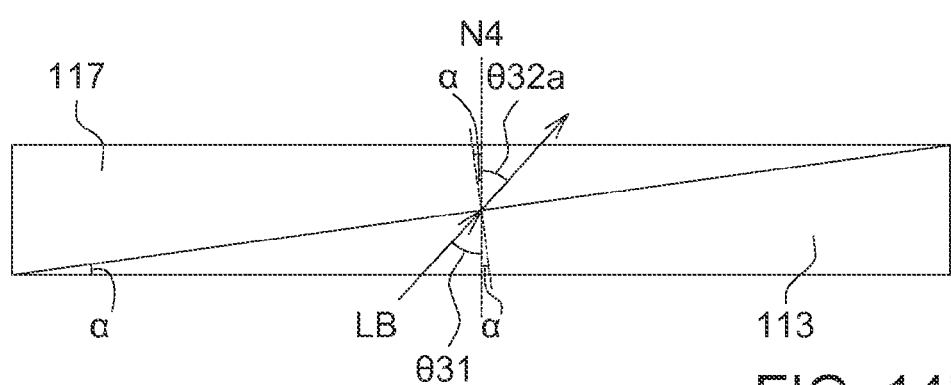
Figure 14C:
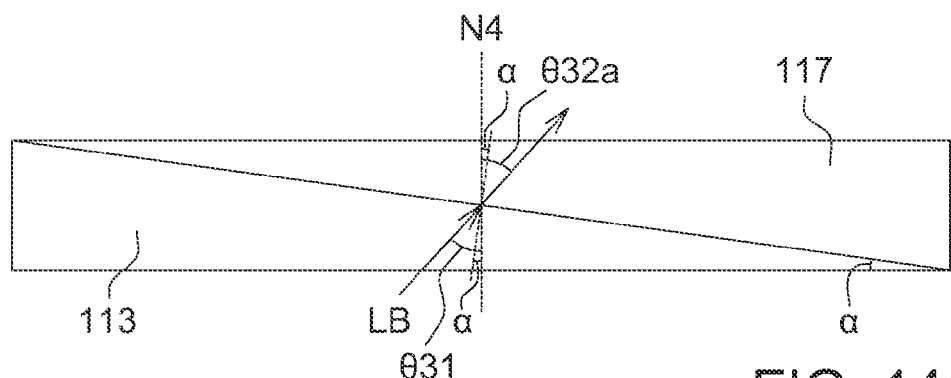

FIGS. 14A-14C are optical paths in a substrate structure with a planarized layer according to an embodiment of the invention. The elements sharing the same labels with those in previous embodiments are the same elements, and the similarities are not repeated here.

As indicated in FIGS. 14A-14C, the light LB may pass through the inclined first asymmetric protrusion 113 (or the flat structure layer 513) and the first planarized layer 117 (or the planarized layer 517). In the process of the light LB passing through different interfaces, various incident angles and deflection angles are formed. Given that the index of refraction of the first asymmetric protrusion 113 and the index of refraction of the structure layer 513 both are n31, and the index of refraction of the first planarized layer 117 and the index of refraction of the planarized layer 517 both are n32. According to the Snell's Law and the calculation of geometric structure, when n31 is larger than n32, a comparison between the embodiments as illustrated in FIGS. 14A and 14B shows that an angle θ32a formed between the light LB and a normal direction N4 of the first planarized layer 117 is larger than an angle θ32 formed between the light LB and a normal direction N3 of the planarized layer 517. Also, a comparison between the embodiments as illustrated in FIGS. 14A and 14C shows that the angle θ32a formed between the light LB and the normal direction N4 of the first planarized layer 117 is smaller than the angle θ32 formed between the light LB and the normal direction N3 of the planarized layer 517. Similarly, when n31 is smaller than n32, a comparison between the embodiments as illustrated in FIGS. 14A and 14B shows that the angle θ32a is smaller than the angle θ32. A comparison between embodiments of FIGS. 14A and 14C shows that the angle θ32a is larger than the angle θ32.

The above results show that, in the first substrate 110, with the first asymmetric protrusion 113 and the first planarized layer 117 being disposed on the surface 111a of the first base 111 adjacent to the liquid crystal layer 130, the angle formed between the light LB and the normal direction N4 of the first planarized layer 117 may be adjusted to optimize the result of the light LB inclinedly entering the liquid crystal layer 130. The first asymmetric protrusion 113 and the first planarized layer 117 have different indices of refraction. When the index of refraction n31 of the first asymmetric protrusion 113 is larger than the index n32 of refraction of the first planarized layer 117, the angle formed between the light LB and the normal direction N4 of the first planarized layer 117 may be increased in an embodiment as indicated in FIG. 14B, and the angle may be reduced in another embodiment as indicated in FIG. 14C. Similarly, when the index of refraction n31 of the first asymmetric protrusion 113 is smaller than the index of refraction n32 of the first planarized layer 117, the angle formed between the light LB and the normal direction N4 of the first planarized layer 117 may be reduced in an embodiment as indicated in FIG. 14B, the angle may be increased in another embodiment as indicated in FIG. 14C.

With the implementation of the first asymmetric protrusion and the pattern designs of the first and the second electrode layers, the inclined angle of the liquid crystal molecules of the liquid crystal display panel disclosed in the above embodiments can be effectively adjusted, so that the transmittance of the incident light is increased, the operating voltage is reduced, and excellent display quality is provided. In addition, the first asymmetric protrusions are disposed corresponding to each of the areas in an electrode unit of a sub pixel, and alignment error which would otherwise deteriorate the display quality will not occur between the first asymmetric protrusions and each of the areas. Moreover, the gap between two first asymmetric protrusions may be used as a buffer area, so that the overall display quality of the liquid crystal display panel is less affected by the assembling error between the first substrate and the second substrate. When there is no need to consider the alignment error, the gap can be set as 0 as well. Further, the first electrode layer may completely or partially cover the first asymmetric protrusion. By selecting the position of the first asymmetric protrusion to be covered by the first electrode layer, the position of the distribution of the liquid crystal molecules can be selected to achieve the predetermined display quality. Furthermore, the index of refraction of the first planarized layer and the index of refraction of the first asymmetric protrusion are different, and the refraction angle of the incident light may be effectively adjusted by adjusting the magnitudes of the index of refraction of the first planarized layer and the index of refraction of the first asymmetric protrusion and the numeric relationships between the indices of refraction. To summarize, via the structure of the first asymmetric protrusion, the incident light in each area is guided to different predetermined directions, the transmittance of the incident light in each area is increased, multi-domain display quality is improved, and wide-angle display quality to the liquid crystal display panel is achieved.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display panel, comprising:
   a first substrate, comprising:
      a first base, wherein the first base has a plurality of sub pixels each having at least one first asymmetric protrusion; and
      a first electrode layer disposed on the first asymmetric protrusion;
   a second substrate assembled to the first substrate; and
   a liquid crystal mixture disposed between the first asymmetric protrusion and the second substrate.

2. The liquid crystal display panel according to claim 1, wherein the liquid crystal mixture comprises a plurality of liquid crystal molecules, an incident light passes through the liquid crystal molecules and an angle ranging between 30-90° is formed between the incident light and a long axis direction of the liquid crystal molecules.

3. The liquid crystal display panel according to claim 1, wherein a cross section of the first asymmetric protrusion is an asymmetric triangle, an asymmetric trapezoid, an asymmetric polygon or an asymmetric arc.

4. The liquid crystal display panel according to claim 1, wherein the first electrode layer partially covers and directly contacts the first asymmetric protrusion.

5. The liquid crystal display panel according to claim 1, wherein the first substrate further comprises:
a first planarized layer disposed on the first asymmetric protrusion, wherein the first electrode layer is disposed on the first planarized layer, and the index of refraction of the first planarized layer and the index of refraction of the first asymmetric protrusion are different.

6. The liquid crystal display panel according to claim 5, wherein the first electrode layer partially covers and directly contacts the first planarized layer.

7. The liquid crystal display panel according to claim 1, wherein the first substrate further comprises:
at least one second asymmetric protrusion disposed on the first asymmetric protrusion.

8. The liquid crystal display panel according to claim 7, wherein a cross section of the second asymmetric protrusion is an asymmetric triangle, an asymmetric trapezoid, an asymmetric polygon or an asymmetric arc.

9. The liquid crystal display panel according to claim 7, wherein the first electrode layer partially covers and directly contacts the second asymmetric protrusion.

10. The liquid crystal display panel according to claim 1, wherein the first substrate comprises at least two first asymmetric protrusions and at least one gap located between the first asymmetric protrusions, and the width of the gap is between 0-10 μm.

11. The liquid crystal display panel according to claim 1, wherein the second substrate further comprises:
a second base; and
a second electrode layer disposed on the second base.

12. The liquid crystal display panel according to claim 1, wherein the second substrate further comprises:
a second base;
at least one third asymmetric protrusion disposed on the second base; and
a second electrode layer disposed on the third asymmetric protrusion.

13. The liquid crystal display panel according to claim 12, wherein the second electrode layer partially covers and directly contacts the third asymmetric protrusion.

14. The liquid crystal display panel according to claim 12, wherein the second substrate further comprises:
a second planarized layer disposed on the third asymmetric protrusion, wherein the second electrode layer is disposed on the second planarized layer, and the index of refraction of the second planarized layer and the index of refraction of the third asymmetric protrusion are different.

15. The liquid crystal display panel according to claim 14, wherein the second electrode layer partially covers and directly contacts the second planarized layer.

16. The liquid crystal display panel according to claim 12, wherein the second substrate further comprises:
at least one fourth asymmetric protrusion disposed on the third asymmetric protrusion.

17. The liquid crystal display panel according to claim 16, wherein the second electrode layer partially covers and directly contacts the fourth asymmetric protrusion.

18. The liquid crystal display panel according to claim 1, wherein the first asymmetric protrusions are symmetrically arranged in the sub pixels.

19. The liquid crystal display panel according to claim 1, wherein each sub pixel has at least two electrode units, and the arrangements of the first asymmetric protrusions in the electrode units are different.

20. The liquid crystal display panel according to claim 1, the first asymmetric protrusion and the first electrode layer are made of the same material.

* * * * *